(12) United States Patent
Lin et al.

(10) Patent No.: US 10,698,199 B2
(45) Date of Patent: Jun. 30, 2020

(54) ANNULAR OPTICAL ELEMENT, IMAGING LENS MODULE AND ELECTRONIC DEVICE

(71) Applicant: LARGAN PRECISION CO., LTD., Taichung (TW)

(72) Inventors: Cheng-Feng Lin, Taichung (TW); Wei-Hung Weng, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 187 days.

(21) Appl. No.: 15/866,733

(22) Filed: Jan. 10, 2018

(65) Prior Publication Data

US 2018/0129040 A1    May 10, 2018

Related U.S. Application Data

(63) Continuation of application No. 15/241,120, filed on Aug. 19, 2016, now Pat. No. 9,904,050.

(30) Foreign Application Priority Data

Jun. 30, 2016    (TW) .............................. 105209912 U

(51) Int. Cl.
*G02B 27/00* (2006.01)
*G02B 13/00* (2006.01)
*G02B 7/02* (2006.01)

(52) U.S. Cl.
CPC ......... *G02B 27/0018* (2013.01); *G02B 7/021* (2013.01); *G02B 7/025* (2013.01); *G02B 13/004* (2013.01); *G02B 13/0055* (2013.01)

(58) Field of Classification Search
CPC .... G02B 5/005; G02B 7/021; G02B 27/0018; G02B 7/022; G02B 7/02
(Continued)

(56) References Cited

U.S. PATENT DOCUMENTS 7,626,773 B2    12/2009    Noda et al.
9,019,617 B2    4/2015    Tsai
(Continued)

FOREIGN PATENT DOCUMENTS

TW    M481412 U    7/2014
TW    M517334 U    2/2016
TW    M519751 U    4/2016

*Primary Examiner* — Collin X Beatty
(74) *Attorney, Agent, or Firm* — McClure, Qualey & Rodack, LLP

(57) ABSTRACT

An annular optical element includes an outer annular surface, an inner annular surface, a first side surface, a second side surface and a plurality of strip-shaped wedge structures. The outer annular surface surrounds a central axis of the annular optical element and includes at least two shrunk portions. The first side surface connects the outer annular surface and the inner annular surface. The second side surface connects the outer annular surface and the inner annular surface, wherein the second side surface is disposed correspondingly to the first side surface. The strip-shaped wedge structures are disposed on the inner annular surface, wherein each of the strip-shaped wedge structures is disposed along a direction from the first side surface towards the second side surface and includes an acute end and a tapered portion connecting the inner annular surface and the acute end.

28 Claims, 29 Drawing Sheets

(58) Field of Classification Search
USPC .................. 359/503, 740, 601, 611, 642, 811
See application file for complete search history.

(56) References Cited

U.S. PATENT DOCUMENTS

| | | |
|---|---|---|
| 9,063,332 B2 | 6/2015 | Kim |
| 9,354,444 B2 | 5/2016 | Lin |
| 2011/0261569 A1 | 10/2011 | Kayanuma |
| 2015/0253532 A1* | 9/2015 | Lin ........................ G02B 7/021 359/601 |

* cited by examiner

ANNULAR OPTICAL ELEMENT, IMAGING LENS MODULE AND ELECTRONIC DEVICE

RELATED APPLICATIONS

The present application is a continuation of the application Ser. No. 15/241,120, filed Aug. 19, 2016, which claims priority to Taiwan Application Serial Number 105209912, filed Jun. 30, 2016, which is herein incorporated by reference.

BACKGROUND

Technical Field

The present disclosure relates to an annular optical element and an imaging lens module. More particularly, the present disclosure relates to an annular optical element and an imaging lens module which are applicable to portable electronic devices.

Description of Related Art

Due to the popularity of personal electronic products and mobile communication products having camera functionalities, such as smart phones and tablet personal computers, the demand for compact imaging lens modules has been increasing and the requirements for high resolution and image quality of present compact imaging lens modules increase significantly.

An annular optical element is generally used to provide an optical space between any two lens elements and locate lens elements of an imaging lens module. A surface property of the annular optical element relates to an effect of suppressing the stray light. Accordingly, an image quality of the imaging lens module is influenced by the surface property of the annular optical element.

A conventional annular optical element is typically formed by an injection molding method and has a smooth and bright surface, which is featured with high reflectivity. As a result, the stray light reflected from the aforementioned surface of the conventional annular optical element cannot be effectively attenuated.

Another conventional annular optical element is provided for suppressing the stray light. The conventional annular optical element is atomized with a surface treatment, so that a reflectivity thereof is reduced. However, the effect of attenuating the stray light is still limited. Therefore, the conventional annular optical element cannot satisfy the requirements of high-end optical systems with camera functionalities.

Given the above, how to improve the surface property of the annular optical element for enhancing the image quality of compact imaging lens modules has become one of the important subjects.

SUMMARY

According to one aspect of the present disclosure, an annular optical element includes an outer annular surface, an inner annular surface, a first side surface, a second side surface and a plurality of strip-shaped wedge structures. The outer annular surface surrounds a central axis of the annular optical element and includes at least two shrunk portions, wherein the shrunk portions are parts of the outer annular surface closer to the central axis. The inner annular surface surrounds the central axis and is closer to the central axis than the outer annular surface. The first side surface connects the outer annular surface and the inner annular surface. The second side surface connects the outer annular surface and the inner annular surface, wherein the second side surface is disposed correspondingly to the first side surface. The strip-shaped wedge structures are disposed on the inner annular surface, wherein each of the strip-shaped wedge structures is disposed along a direction from the first side surface towards the second side surface and includes an acute end and a tapered portion connecting the inner annular surface and the acute end.

According to another aspect of the present disclosure, an imaging lens module includes the annular optical element according to the foregoing aspect and an optical lens assembly. The optical lens assembly includes a plurality of lens elements, wherein the annular optical element is connected to at least one of the lens elements.

According to another aspect of the present disclosure, an electronic device includes the imaging lens module according to the foregoing aspect.

According to another aspect of the present disclosure, an imaging lens module, which is applied to an electronic device, includes a plastic barrel, an optical lens assembly and an annular optical element. The optical lens assembly is disposed in the plastic barrel and includes a plurality of lens elements. The annular optical element is disposed in the plastic barrel and includes an outer annular surface, an inner annular surface, a first side surface, a second side surface and a plurality of strip-shaped wedge structures. The outer annular surface surrounds a central axis of the annular optical element and includes at least two shrunk portions, wherein the shrunk portions are parts of the outer annular surface closer to the central axis. The inner annular surface surrounds the central axis and is closer to the central axis than the outer annular surface. The first side surface connects the outer annular surface and the inner annular surface, wherein the first side surface is connected to at least one of the lens elements. The second side surface connects the outer annular surface and the inner annular surface, wherein the second side surface is farther from an imaged object than the first side surface and not connected to any of the lens elements. The strip-shaped wedge structures are disposed on the inner annular surface, wherein the annular optical element with the strip-shaped wedge structures is formed integrally, and each of the strip-shaped wedge structures is disposed along a direction from the first side surface towards the second side surface and includes an acute end and a tapered portion connecting the inner annular surface and the acute end.

DETAILED DESCRIPTION

1st Embodiment

Figure 1A:
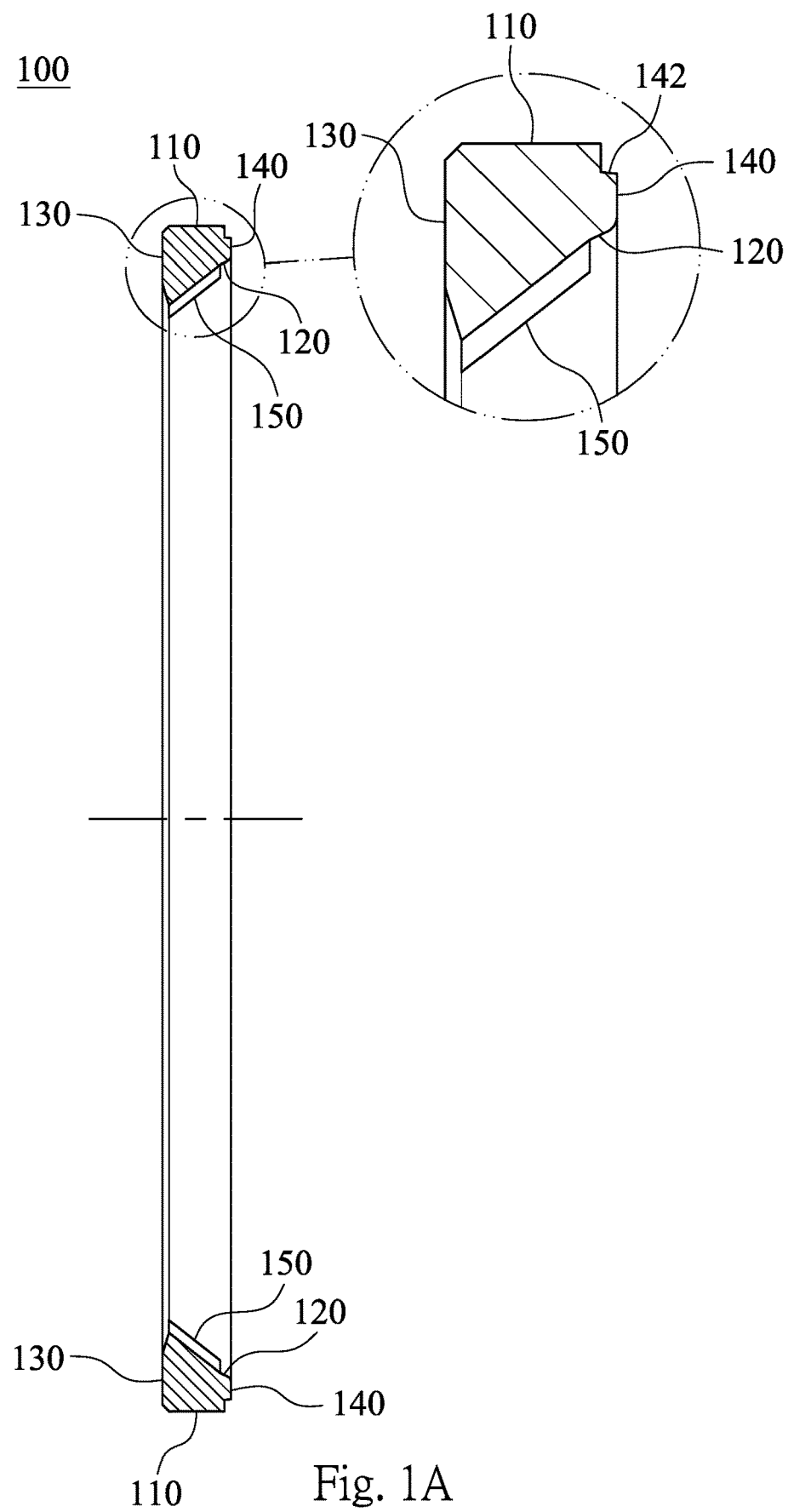
FIG. 1A is a schematic view of an annular optical element according to the 1 st embodiment of the present disclosure.
Figure 1B:
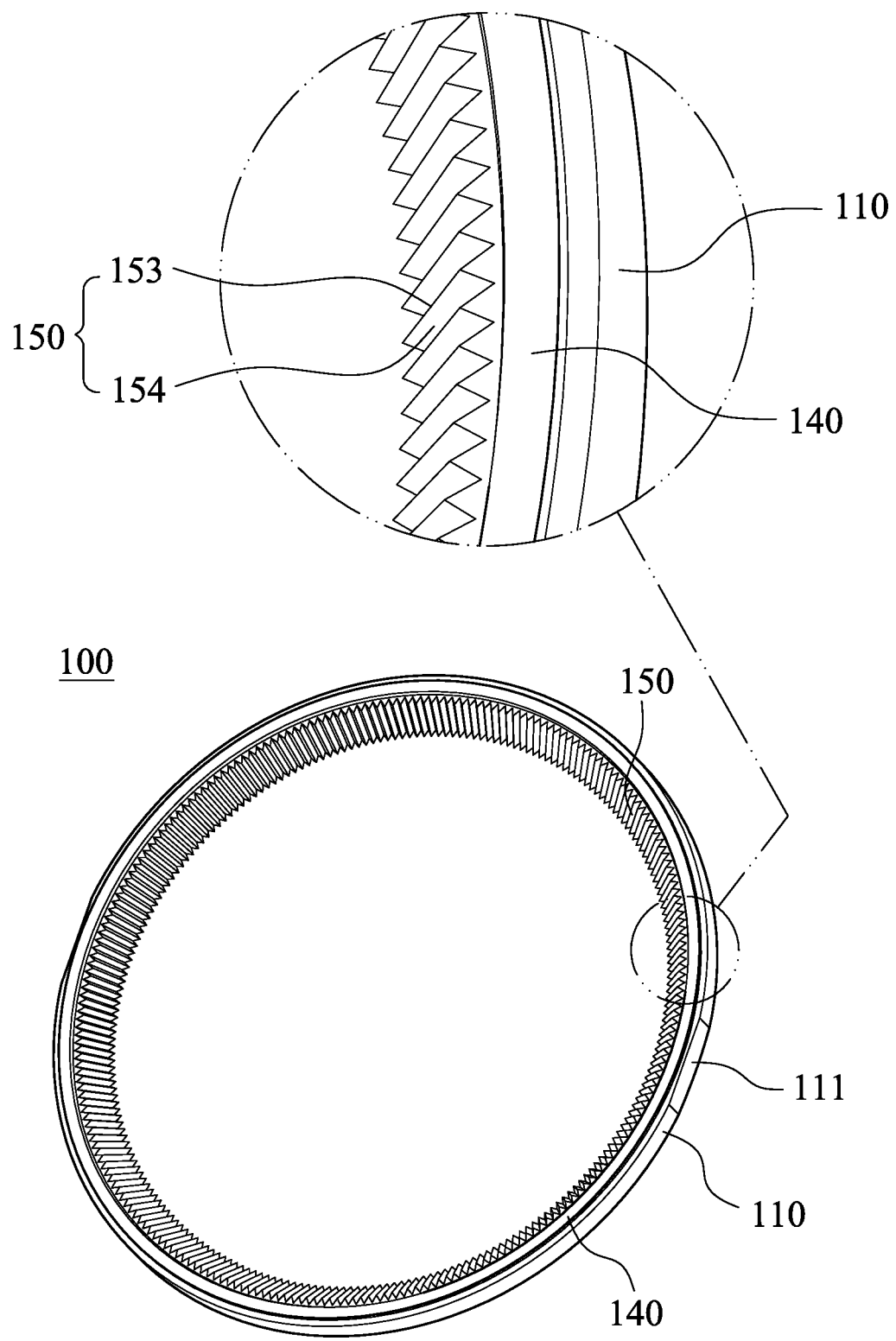
FIG. 1B is a three-dimensional view of the annular optical element according to the 1st embodiment.

FIG. 1A is a schematic view of an annular optical element 100 according to the 1st embodiment of the present disclosure, and FIG. 1B is a three-dimensional view of the annular optical element 100 according to the 1st embodiment. In FIG. 1A and FIG. 1B, the annular optical element 100 includes an outer annular surface 110, an inner annular surface 120, a first side surface 130, a second side surface 140 and a plurality of strip-shaped wedge structures 150.

Figure 1C:
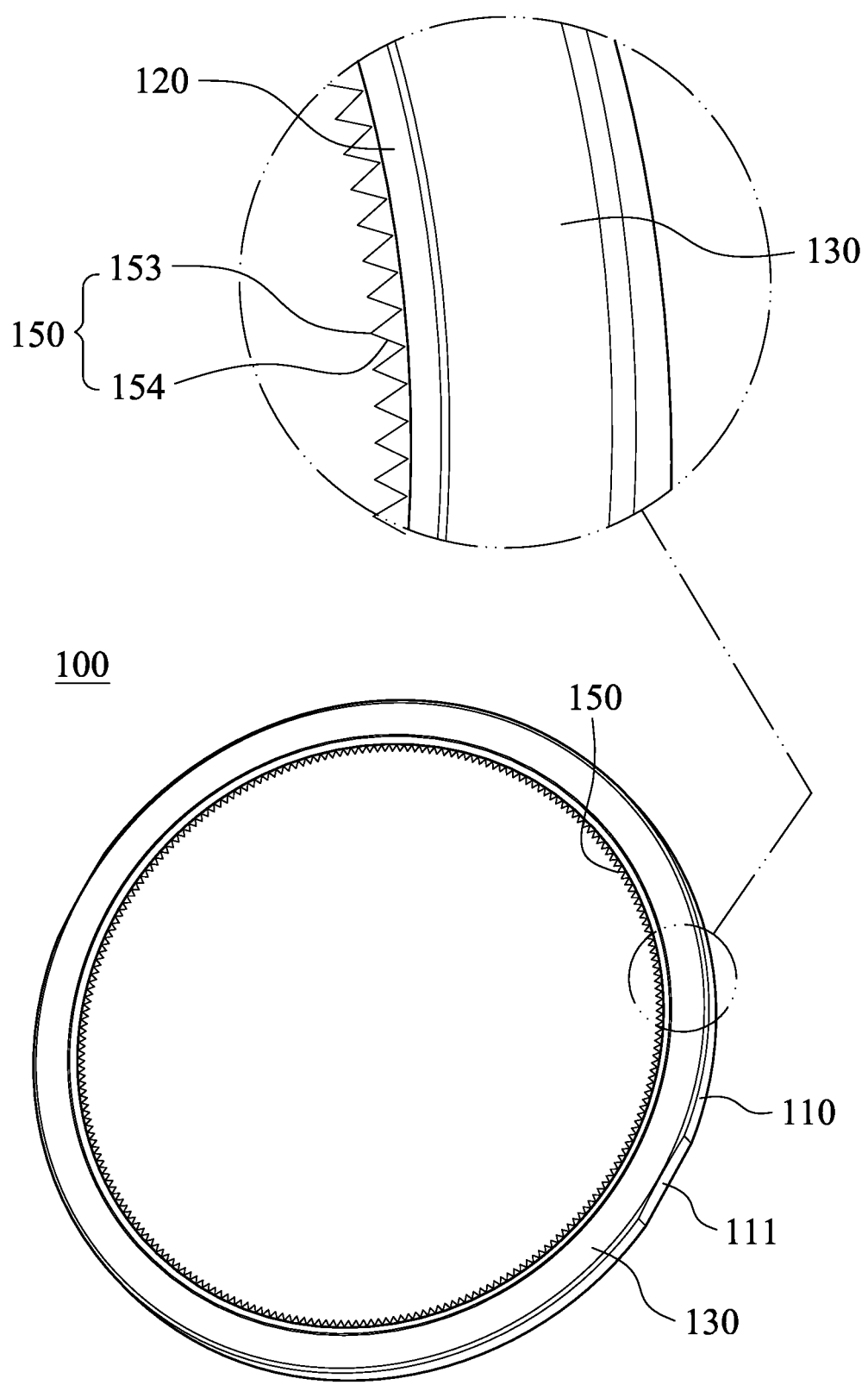
FIG. 1C is another three-dimensional view of the annular optical element according to the 1st embodiment.
Figure 1D:
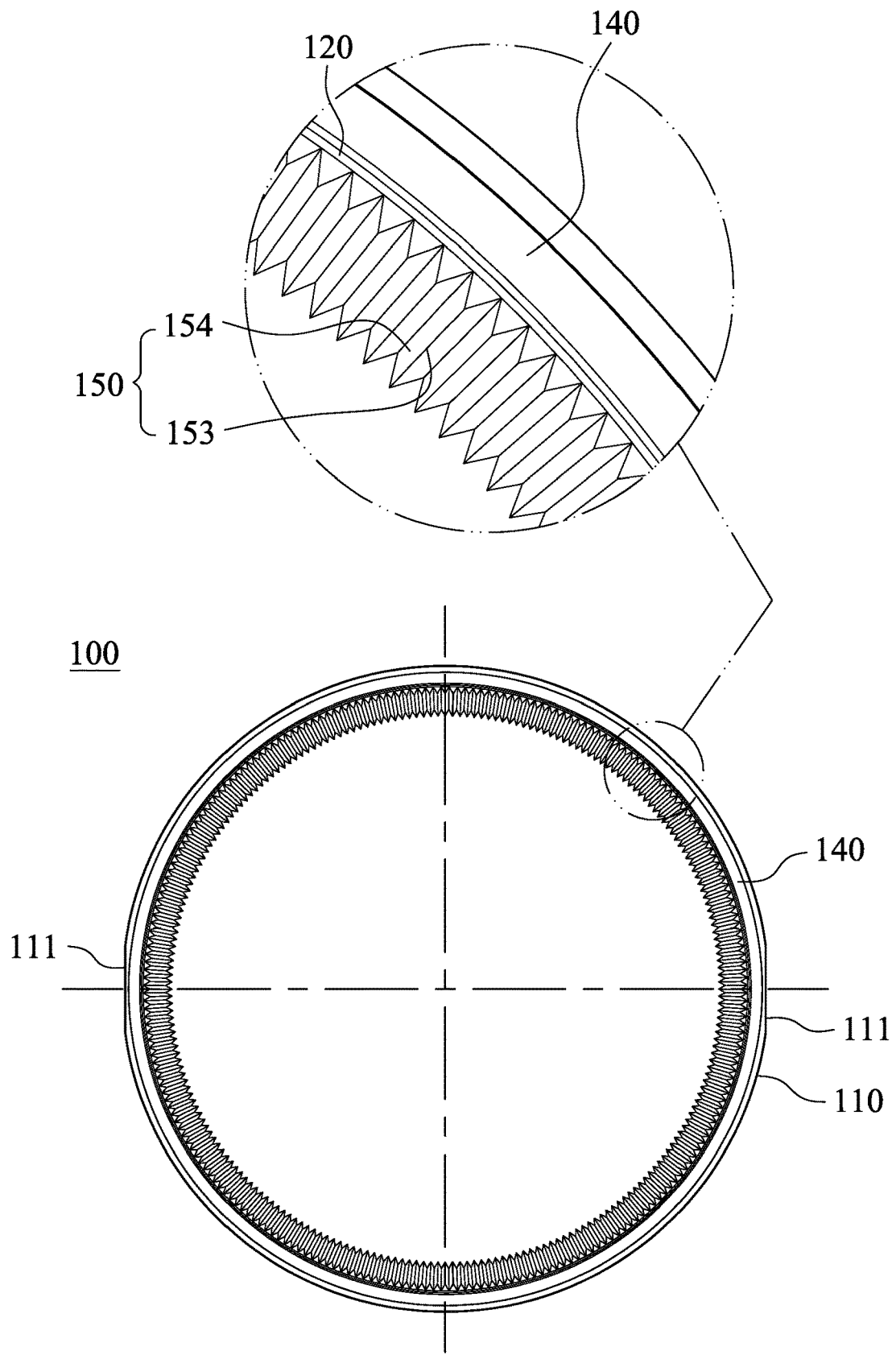
FIG. 1D is a plane view of the annular optical element according to the 1st embodiment.

FIG. 1C is another three-dimensional view of the annular optical element 100 according to the 1st embodiment, and FIG. 1D is a plane view of the annular optical element 100 according to the 1st embodiment. In FIG. 1C and FIG. 1D, the outer annular surface 110 surrounds a central axis of the annular optical element 100 and includes at least two shrunk portions 111, wherein the shrunk portions 111 are parts of the outer annular surface 110 closer to the central axis. Each of the shrunk portions 111 can be a notch (such as a D-cut) of an injection gate required by a mold injection method, so that each of the shrunk portions 111 can include a gate trace. Each of the shrunk portions 111 can include a planar feature for cutting tool alignment in a lens element cutting process after the mold injection method. In the 1st embodiment, the outer annular surface 110 includes two shrunk portions 111, wherein the shrunk portions 111 are parts of the outer annular surface 110 closer to the central axis and symmetrically disposed around the central axis. Furthermore, in other embodiments (not shown herein), an outer annular surface can include three, four or more shrunk portions, wherein the shrunk portions are parts of the outer annular surface closer to a central axis. The shrunk portions can be symmetrically disposed around the central axis.

In FIG. 1A, the inner annular surface 120 surrounds the central axis of the annular optical element 100 and is closer to the central axis than the outer annular surface 110.

The first side surface 130 connects the outer annular surface 110 and the inner annular surface 120. The second side surface 140 connects the outer annular surface 110 and the inner annular surface 120, wherein the second side surface 140 is disposed correspondingly to the first side surface 130.

In FIG. 1A to FIG. 1D, the strip-shaped wedge structures 150 are disposed on the inner annular surface 120, wherein each of the strip-shaped wedge structures 150 is disposed along a direction from the first side surface 130 towards the second side surface 140 and includes an acute end 153 and a tapered portion 154, which connects the inner annular surface 120 and the acute end 153. The aforementioned "the direction from the first side surface 130 towards the second side surface 140" is a direction from the second side surface 140 towards the first side surface 130. Accordingly, it can be said that each of the strip-shaped wedge structures 150 is disposed along the direction from the second side surface 140 towards the first side surface 130. Therefore, it is favorable for effectively attenuating the stray light reflected from the annular optical element 100 so as to enhance the image quality of the imaging lens module.

In the 1st embodiment, the strip-shaped wedge structures 150 are disposed on the inner annular surface 120, wherein each of the strip-shaped wedge structures 150 is disposed along the direction from the first side surface 130 towards the second side surface 140. The inner annular surface 120 has a circumferential direction around the central axis of the annular optical element 100. The strip-shaped wedge structures 150 with the same geometric structures are disposed on the inner annular surface 120, and regularly arranged with the same spaces along the circumferential direction of the inner annular surface 120. Furthermore, each of the strip-shaped wedge structures 150 includes the acute end 153 and the tapered portion 154 connecting the inner annular surface 120 and the acute end 153. The tapered portion 154 is tapered from the inner annular surface 120 towards the central axis of the annular optical element 100, so that the tapered portion 154 is tapered from the inner annular surface 120 to the acute end 153. In other embodiments (not shown herein), each of tapered portions can be tapered from an inner annular surface towards a central axis of the annular optical element, tapered from a first side surface towards a second side surface (i.e. a height of each of strip-shaped wedge structures becomes smaller from a side near the first side surface to a side near the second side surface), or a combination thereof, so that the tapered portion could be tapered from the inner annular surface to an acute end.

In detail, the annular optical element 100 with the strip-shaped wedge structures 150 can be formed integrally.

Therefore, it is favorable for producing the strip-shaped wedge structures 150 more easily.

A number of the strip-shaped wedge structures 150 can be greater than or equal to 90, and smaller than or equal to 420. Therefore, it is favorable for the annular optical elements 100 to obtain a denser arrangement of the strip-shaped wedge structures 150 so as to effectively absorb the stray light. Preferably, the number of the strip-shaped wedge structures 150 can be greater than or equal to 150, and smaller than or equal to 360. Therefore, it is favorable for the annular optical elements 100 with smaller inner diameter to reduce interference among optical elements of a compact imaging lens module. In the 1st embodiment, the number of the strip-shaped wedge structures 150 is 240, wherein the strip-shaped wedge structures 150 with the same geometric structures are disposed on the inner annular surface 120, and regularly arranged with the same spaces along the circumferential direction of the inner annular surface 120.

Figure 1E:
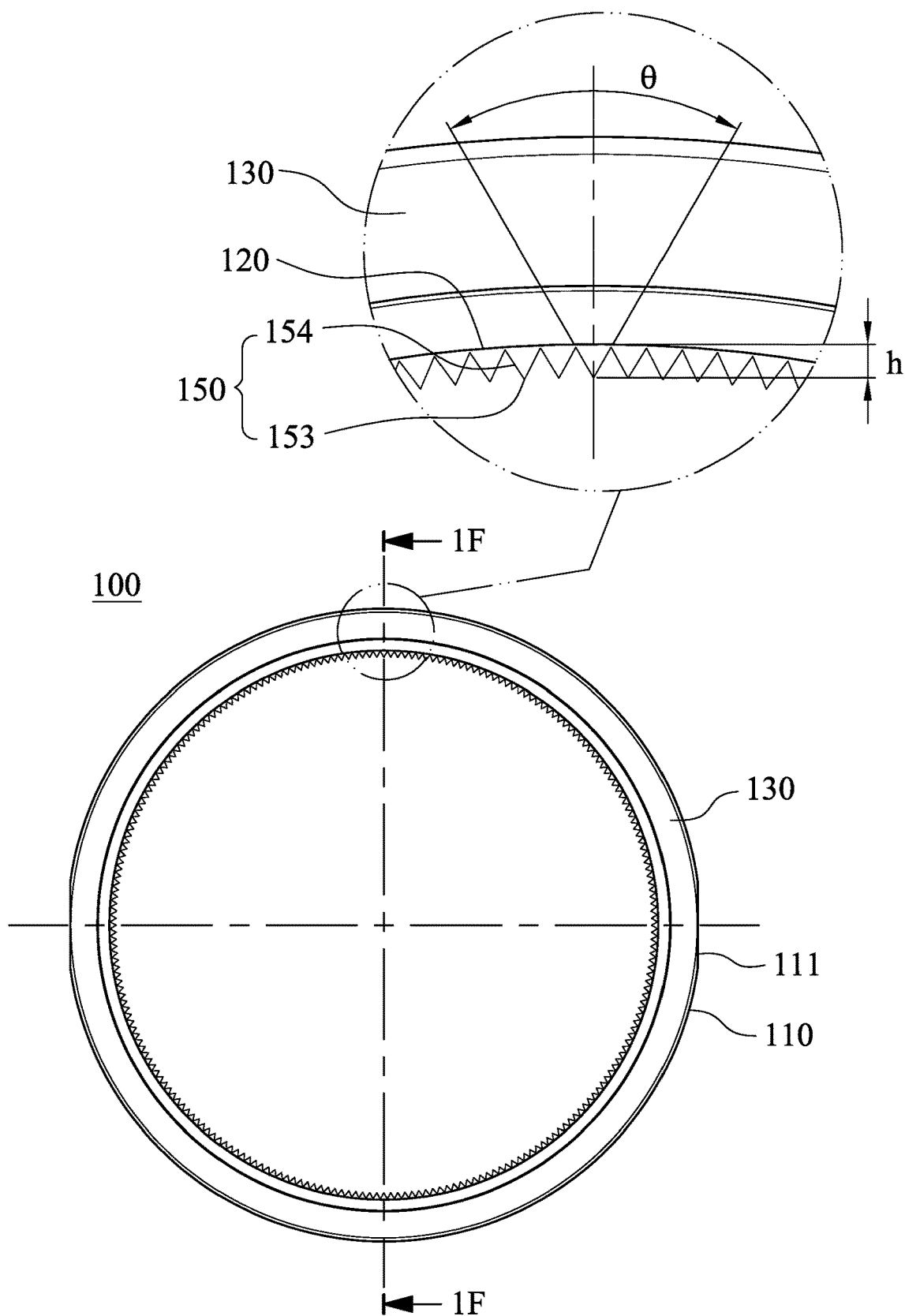
FIG. 1E is another plane view of the annular optical element according to the 1st embodiment.

FIG. 1E is another plane view of the annular optical element 100 according to the 1st embodiment. In FIG. 1E, when an angle of each of the acute ends 153 is θ, the following condition can be satisfied: 35 degrees<θ<90 degrees. Therefore, it is favorable for absorbing the stray light of the annular optical element 100. Preferably, the following condition can be satisfied: 45 degrees<θ<75 degrees. Therefore, it is favorable for maintaining the structural quality of the annular optical element 100 in mass production. In the 1st embodiment, the aforementioned parameter θ is 60 degrees according to FIG. 1E. The value of parameter θ of each cross-section orthogonal to the central axis slightly differs from each other and satisfies the aforementioned condition "45 degrees<θ<75 degrees".

In FIG. 1D and FIG. 1E, a cross-section orthogonal to the central axis of each of the strip-shaped wedge structures 150 can be isosceles triangle. Therefore, it is favorable for simplifying the mold machining complexity of the annular optical element 100. In the 1st embodiment, each cross-section orthogonal to the central axis of each of the strip-shaped wedge structures 150 is isosceles triangle.

In FIG. 1E, when a distance between the inner annular surface 120 and the acute end 153 of each of the strip-shaped wedge structures 150 is h, the following condition can be satisfied: 0.03 mm<h<0.25 mm. The aforementioned distance is between a middle point of a base (located on the inner annular surface 120) and a vertex (located on the acute end 153) of a triangle of a cross-section orthogonal to the central axis of each of the strip-shaped wedge structures 150. Therefore, it is favorable for obtaining a deeper structural depth of the strip-shaped wedge structures 150 so as to enhance the effect of absorbing the stray light. Preferably, the following condition can be satisfied: 0.04 mm<h<0.15 mm. Therefore, it is favorable for maintaining the effect of absorbing the stray light and satisfying the requirements of mass production of the annular optical element 100.

In FIG. 1A, each of the strip-shaped wedge structures 150 can have even height. Therefore, it is favorable for simplifying the mold machining process of the strip-shaped wedge structures 150. In the 1st embodiment, each of the strip-shaped wedge structures 150 has even height. That is, for each of the strip-shaped wedge structures 150, heights from a side near the first side surface 130 to a side near the second side surface 140 are approximating to each other, as well as the aforementioned parameter h. The value of the aforementioned parameter h according to FIG. 1E is 0.058 mm. The value of parameter h of each cross-section orthogonal to the central axis is approximating to each other (i.e. approximating to 0.058 mm) and satisfies the aforementioned condition "0.04 mm<h<0.15 mm".

In FIG. 1B, an entire surface of the acute end 153 and an entire surface of the tapered section 154 of each of the strip-shaped wedge structures 150 can be both smooth surfaces. Therefore, it is favorable for reducing process steps of the mold machining of the strip-shaped wedge structures 150 due to without the atomization process.

In FIG. 1E, the inner annular surface 120 can have a zigzag shape. Therefore, it is favorable for effectively attenuating the stray light reflected from the annular optical element 100. In the 1st embodiment, an inner diameter of the inner annular surface 120 becomes greater from the side near the first side surface 130 to the side near the second side surface 140, and each of the strip-shaped wedge structures 150 has even height. Hence, the inner annular surface 120 has the zigzag shape of a view from the first side surface 130. That is, an opening edge enclosed by the inner annular surface 120 has the zigzag shape shown as FIG. 1E.

Figure 1F:
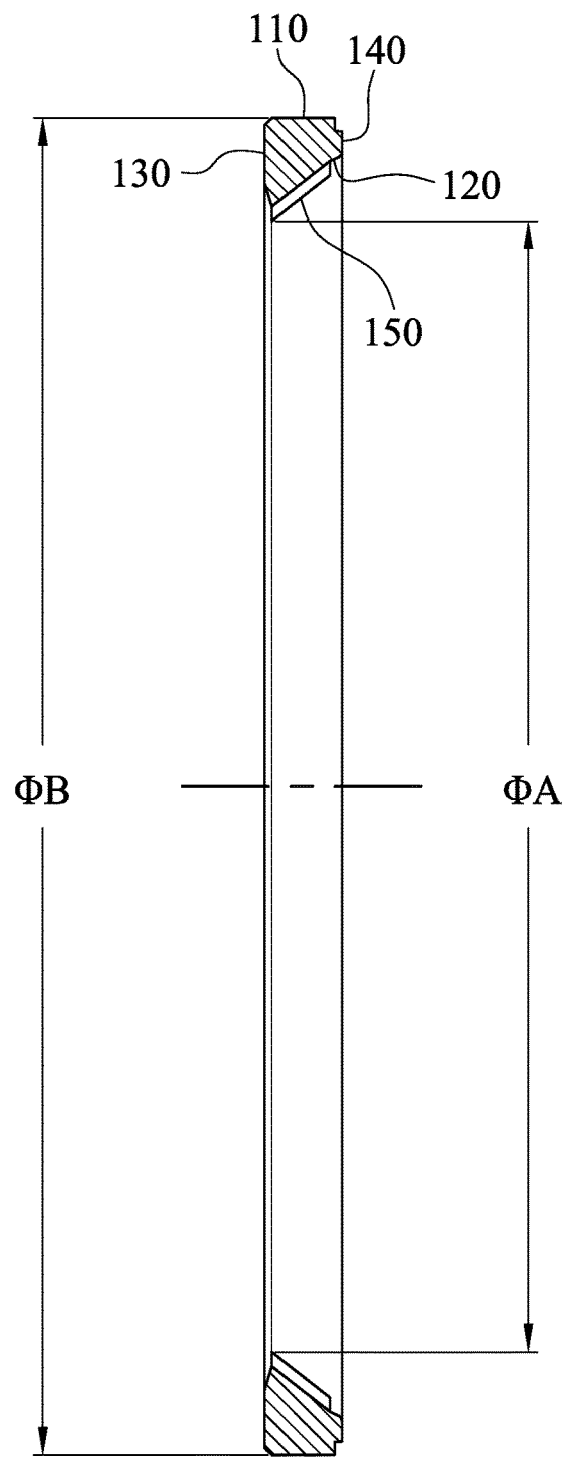
FIG. 1F is a cross-sectional view along line 1F-1F of FIG. 1E.

FIG. 1F is a cross-sectional view along line 1F-1F of FIG. 1E. In FIG. 1F, when a minimum inner diameter formed by the strip-shaped wedge structures 150 of the annular optical element 100 (i.e. a minimum inner diameter formed by the acute ends 153) is φA, and a maximum outer diameter of the outer annular surface 110 is φB, the following condition can be satisfied: 0.75<φA/φB<1.0. Therefore, it is favorable for obtaining a greater light output range and preventing from excessively blocking light of the annular optical element 100.

In FIG. 1A, at least one of the first side surface 130 and the second side surface 140 can include a recessed portion 142 connected to the outer annular surface 110. Therefore, it is favorable for preventing from excessive thickness of a part of the annular optical element 100 so as to increase the efficiency of injection molding method. In the 1st embodiment, the second side surface 140 of the annular optical element 100 includes the recessed portion 142 connected to the outer annular surface 110.

The data of the aforementioned parameters of the annular optical element 100 according to the 1st embodiment of the present disclosure are listed in the following Table 1, wherein the parameters are also shown as FIG. 1E and FIG. 1F.

TABLE 1

| 1st Embodiment | | | |
|---|---|---|---|
| θ (deg.) | 60 | ΦB (mm) | 5.43 |
| h (mm) | 0.058 | ΦA/ΦB | 0.85 |
| ΦA (mm) | 4.64 | | |

2nd Embodiment

Figure 2A:
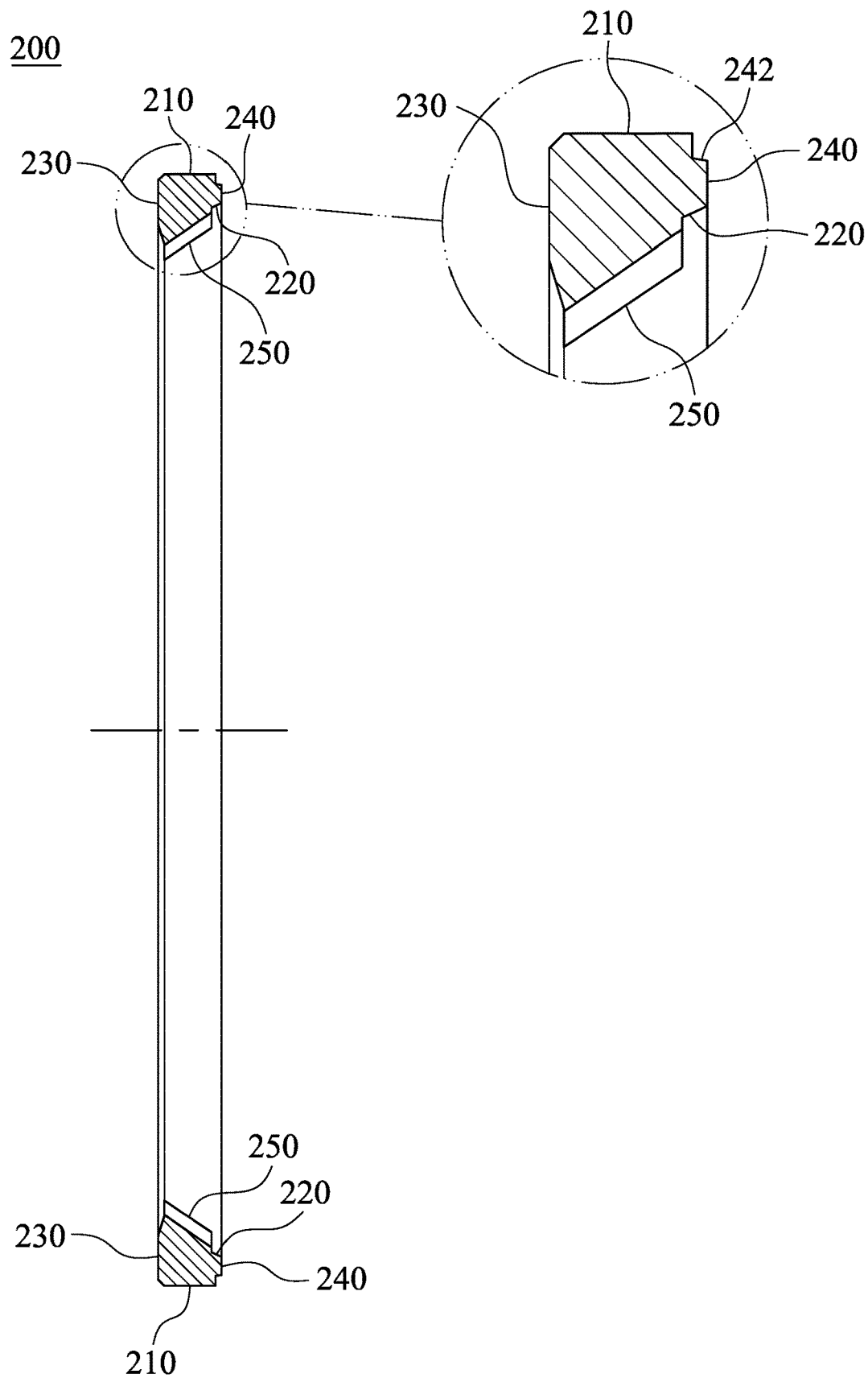
FIG. 2A is a schematic view of an annular optical element according to the 2nd embodiment of the present disclosure.
Figure 2B:
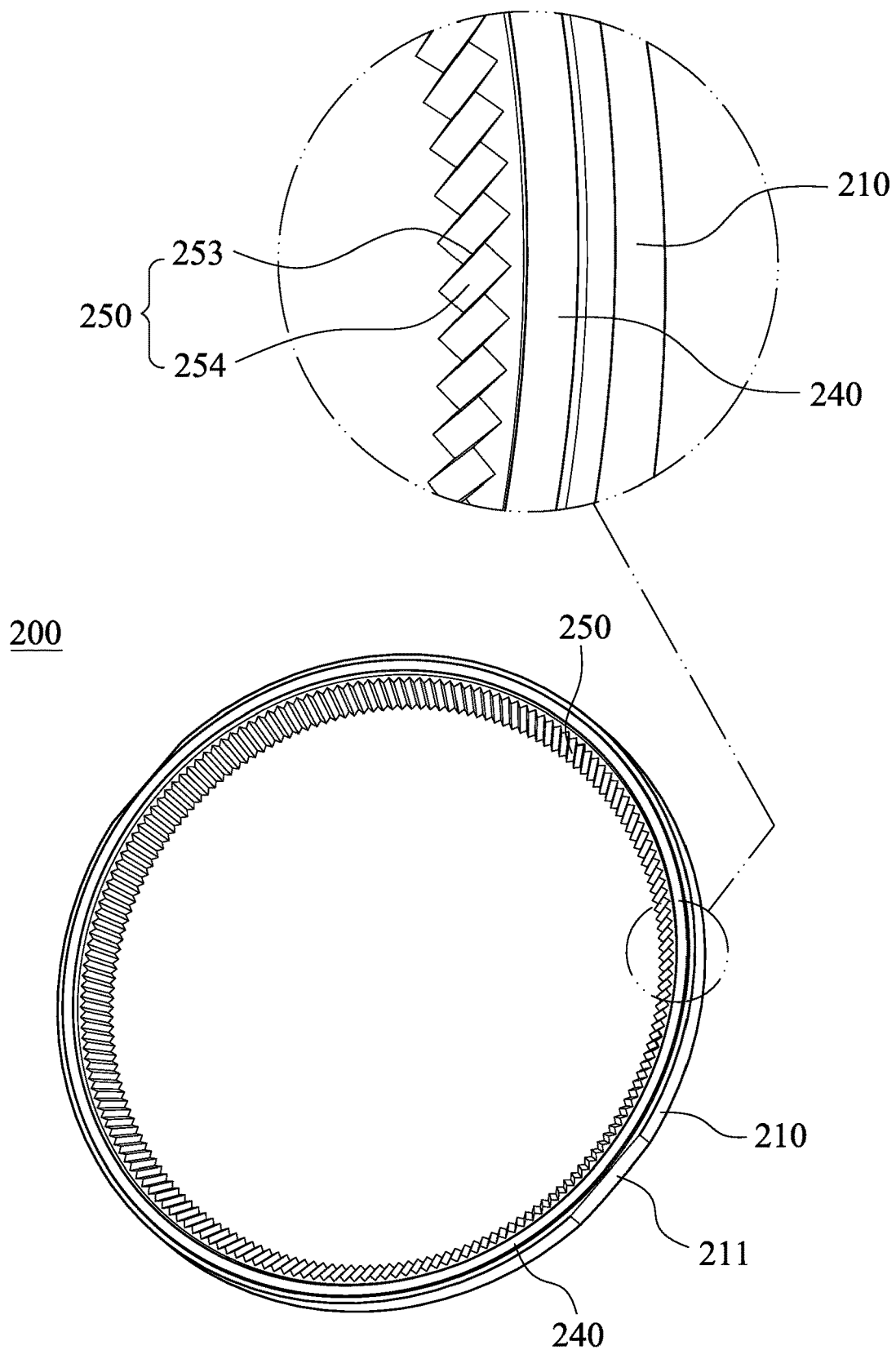
FIG. 2B is a three-dimensional view of the annular optical element according to the 2nd embodiment.

FIG. 2A is a schematic view of an annular optical element 200 according to the 2nd embodiment of the present disclosure, and FIG. 2B is a three-dimensional view of the annular optical element 200 according to the 2nd embodiment. In FIG. 2A and FIG. 2B, the annular optical element 200 includes an outer annular surface 210, an inner annular surface 220, a first side surface 230, a second side surface 240 and a plurality of strip-shaped wedge structures 250.

Figure 2C:
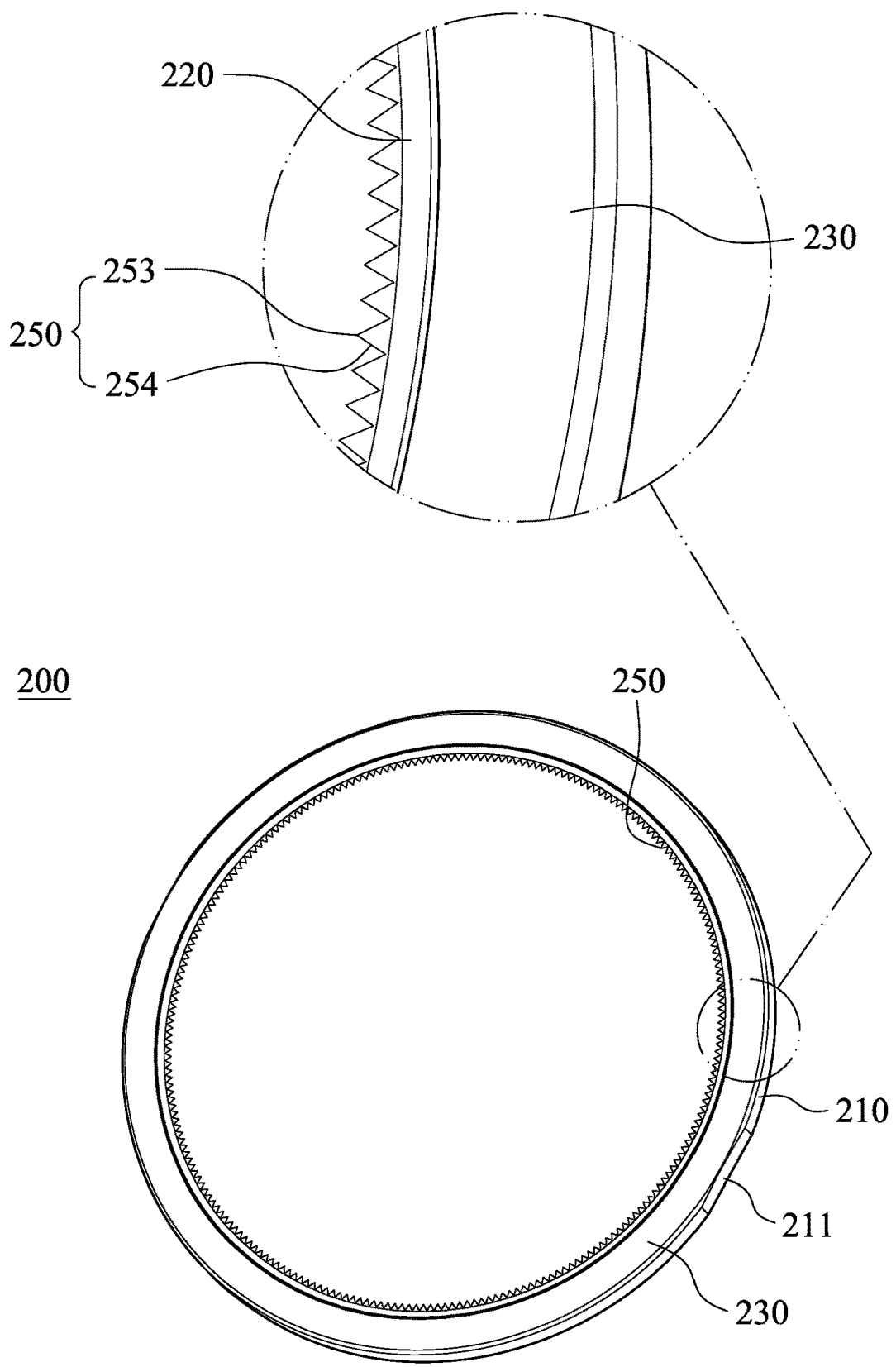
FIG. 2C is another three-dimensional view of the annular optical element according to the 2nd embodiment.
Figure 2D:
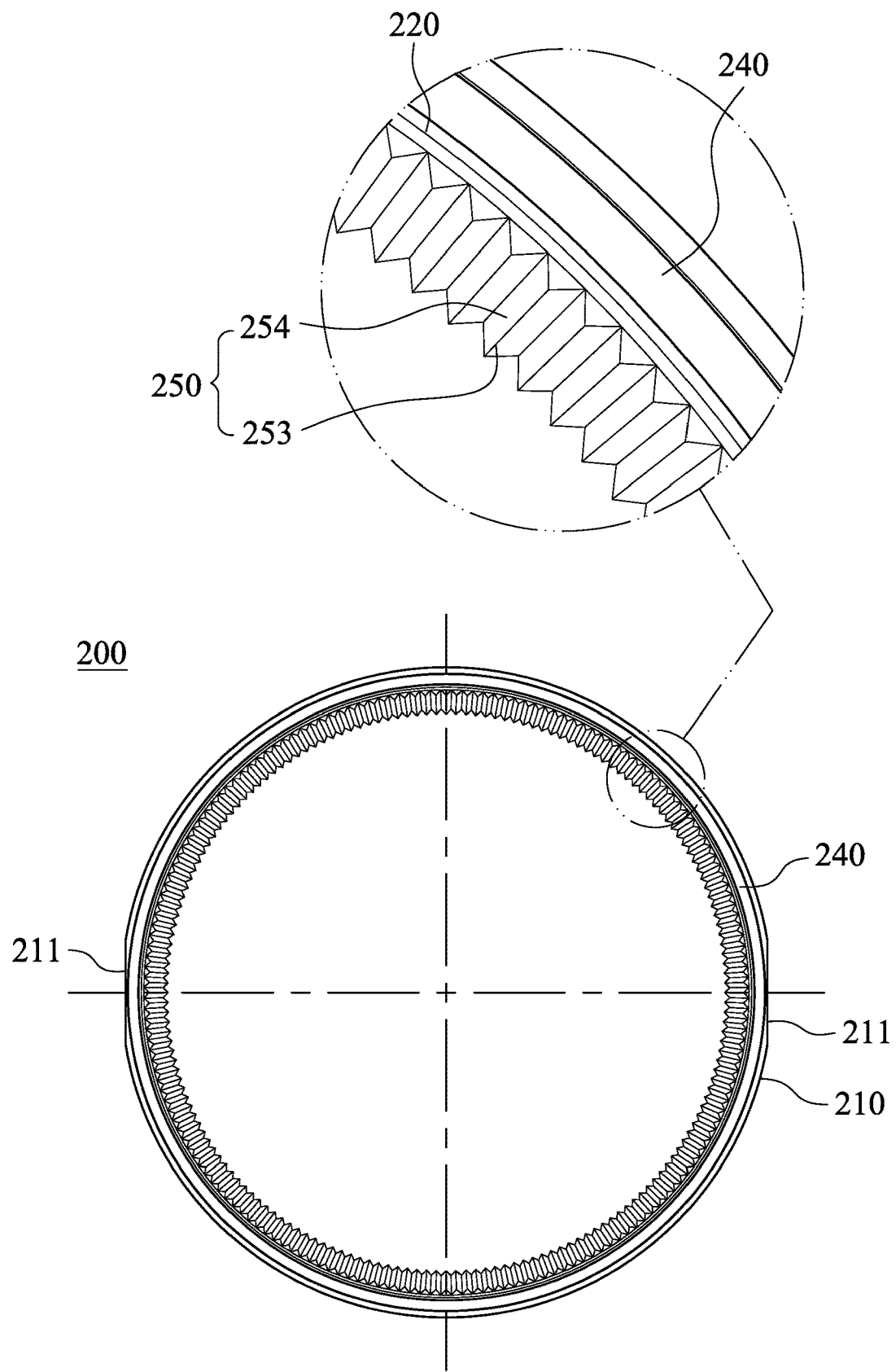
FIG. 2D is a plane view of the annular optical element according to the 2nd embodiment.

FIG. 2C is another three-dimensional view of the annular optical element 200 according to the 2nd embodiment, and FIG. 2D is a plane view of the annular optical element 200 according to the 2nd embodiment. In FIG. 2C and FIG. 2D, the outer annular surface 210 surrounds a central axis of the annular optical element 200 and includes two shrunk portions 211, wherein the shrunk portions 211 are parts of the outer annular surface 210 closer to the central axis and symmetrically disposed around the central axis.

In FIG. 2A, the inner annular surface 220 surrounds the central axis of the annular optical element 200 and is closer to the central axis than the outer annular surface 210. The first side surface 230 connects the outer annular surface 210 and the inner annular surface 220. The second side surface 240 connects the outer annular surface 210 and the inner annular surface 220, wherein the second side surface 240 is disposed correspondingly to the first side surface 230.

In FIG. 2A to FIG. 2D, the strip-shaped wedge structures 250 are disposed on the inner annular surface 220, wherein each of the strip-shaped wedge structures 250 is disposed along a direction from the first side surface 230 towards the second side surface 240. The inner annular surface 220 has a circumferential direction around the central axis of the annular optical element 200. The strip-shaped wedge structures 250 with the same geometric structures are disposed on the inner annular surface 220, and regularly arranged with the same spaces along the circumferential direction of the inner annular surface 220. Furthermore, each of the strip-shaped wedge structures 250 includes an acute end 253 and a tapered portion 254 connecting the inner annular surface 220 and the acute end 253. The tapered portion 254 is tapered from the inner annular surface 220 towards the central axis of the annular optical element 200, so that the tapered portion 254 is tapered from the inner annular surface 220 to the acute end 253.

In detail, the annular optical element 200 with the strip-shaped wedge structures 250 is formed integrally. A number of the strip-shaped wedge structures 250 is 180, wherein the strip-shaped wedge structures 250 with the same geometric structures are disposed on the inner annular surface 220, and regularly arranged with the same spaces along the circumferential direction of the inner annular surface 220.

Figure 2E:
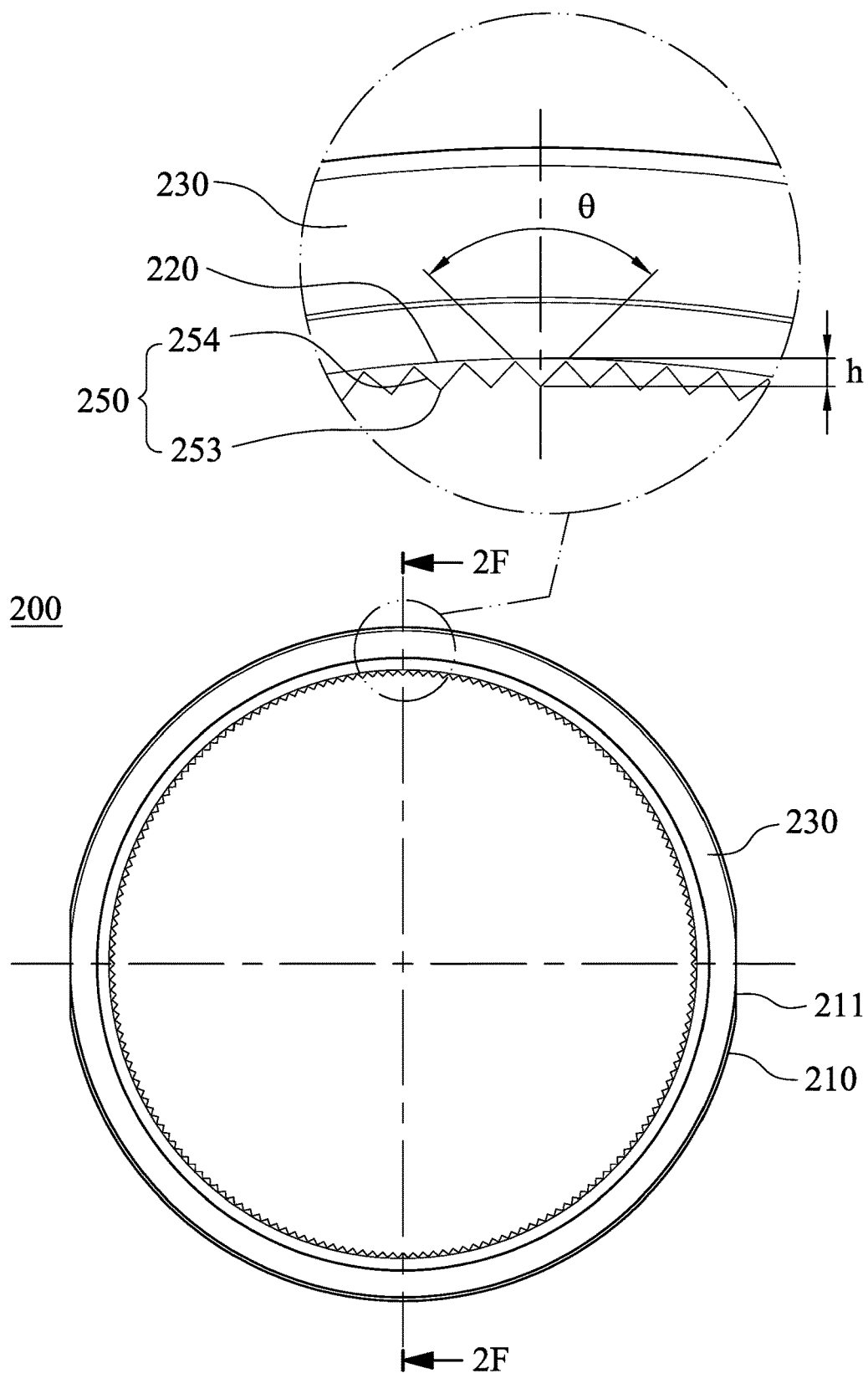
FIG. 2E is another plane view of the annular optical element according to the 2nd embodiment.

FIG. 2E is another plane view of the annular optical element 200 according to the 2nd embodiment. In FIG. 2D and FIG. 2E, a cross-section orthogonal to the central axis of each of the strip-shaped wedge structures 250 is isosceles triangle. The inner annular surface 220 has a zigzag shape.

In FIG. 2A and FIG. 2B, each of the strip-shaped wedge structures 250 has even height. That is, for each of the strip-shaped wedge structures 250, heights from a side near the first side surface 230 to a side near the second side surface 240 are approximating to each other. An entire surface of the acute end 253 and an entire surface of the tapered section 254 of each of the strip-shaped wedge structures 250 are both smooth surfaces. The second side surface 240 of the annular optical element 200 includes a recessed portion 242 connected to the outer annular surface 210.

Figure 2F:
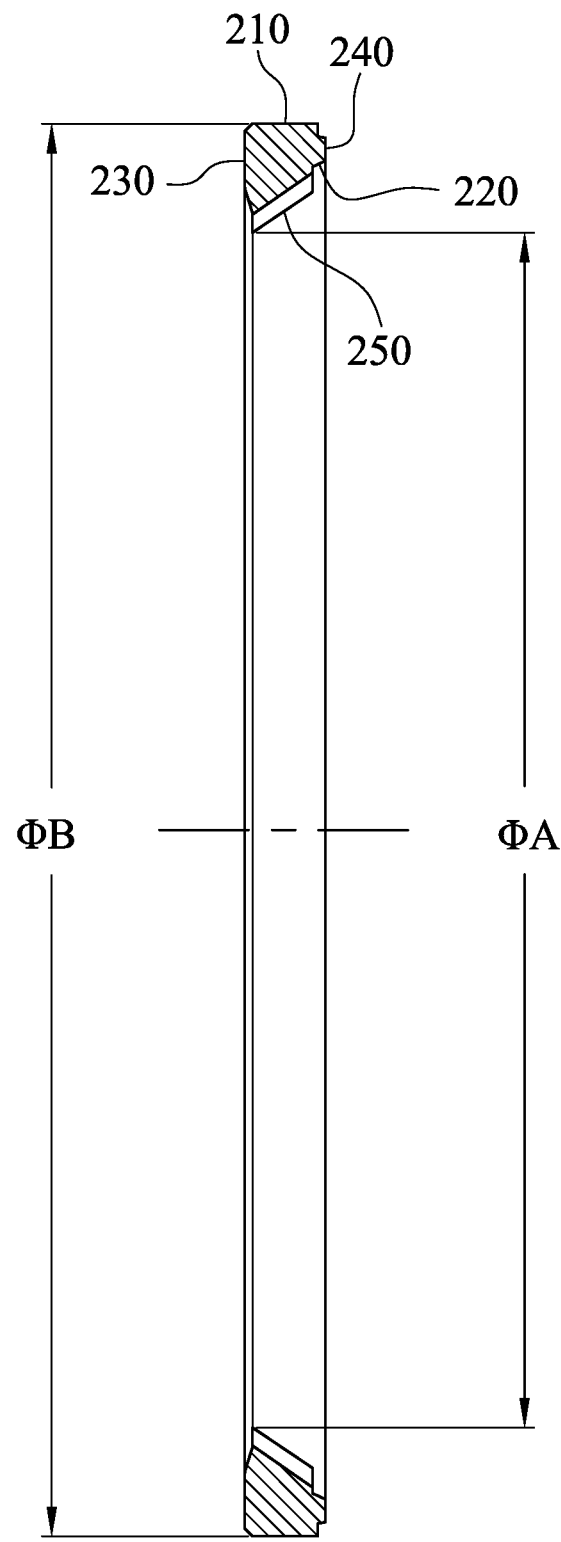
FIG. 2F is a cross-sectional view along line 2F-2F of FIG. 2E.

FIG. 2F is a cross-sectional view along line 2F-2F of FIG. 2E. The data of the parameters θ, h, ϕA, ϕB and ϕA/ϕB of the annular optical element 200 according to the 2nd embodiment of the present disclosure are listed in the following Table 2, wherein the parameters are also shown as FIG. 2E and FIG. 2F. The definitions of these parameters shown in Table 2 are the same as those stated in the annular optical element 100 of the 1st embodiment with corresponding values for the annular optical element 200.

TABLE 2

| 2nd Embodiment | | | |
|---|---|---|---|
| θ (deg.) | 89.3 | ΦB (mm) | 5.53 |
| h (mm) | 0.047 | ΦA/ΦB | 0.85 |
| ΦA (mm) | 4.68 | | |

3rd Embodiment

Figure 3A:
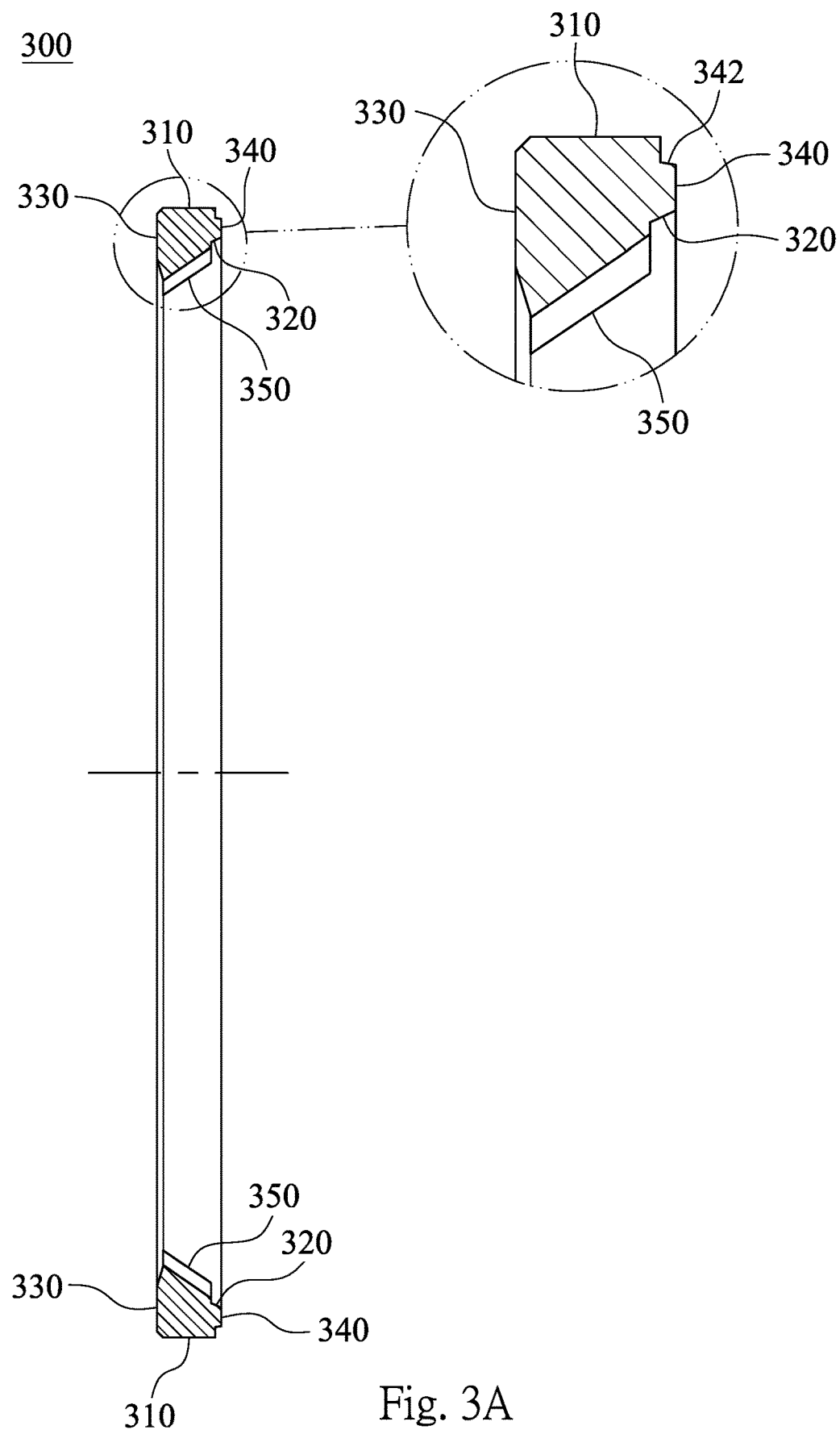
FIG. 3A is a schematic view of an annular optical element according to the 3rd embodiment of the present disclosure.
Figure 3B:
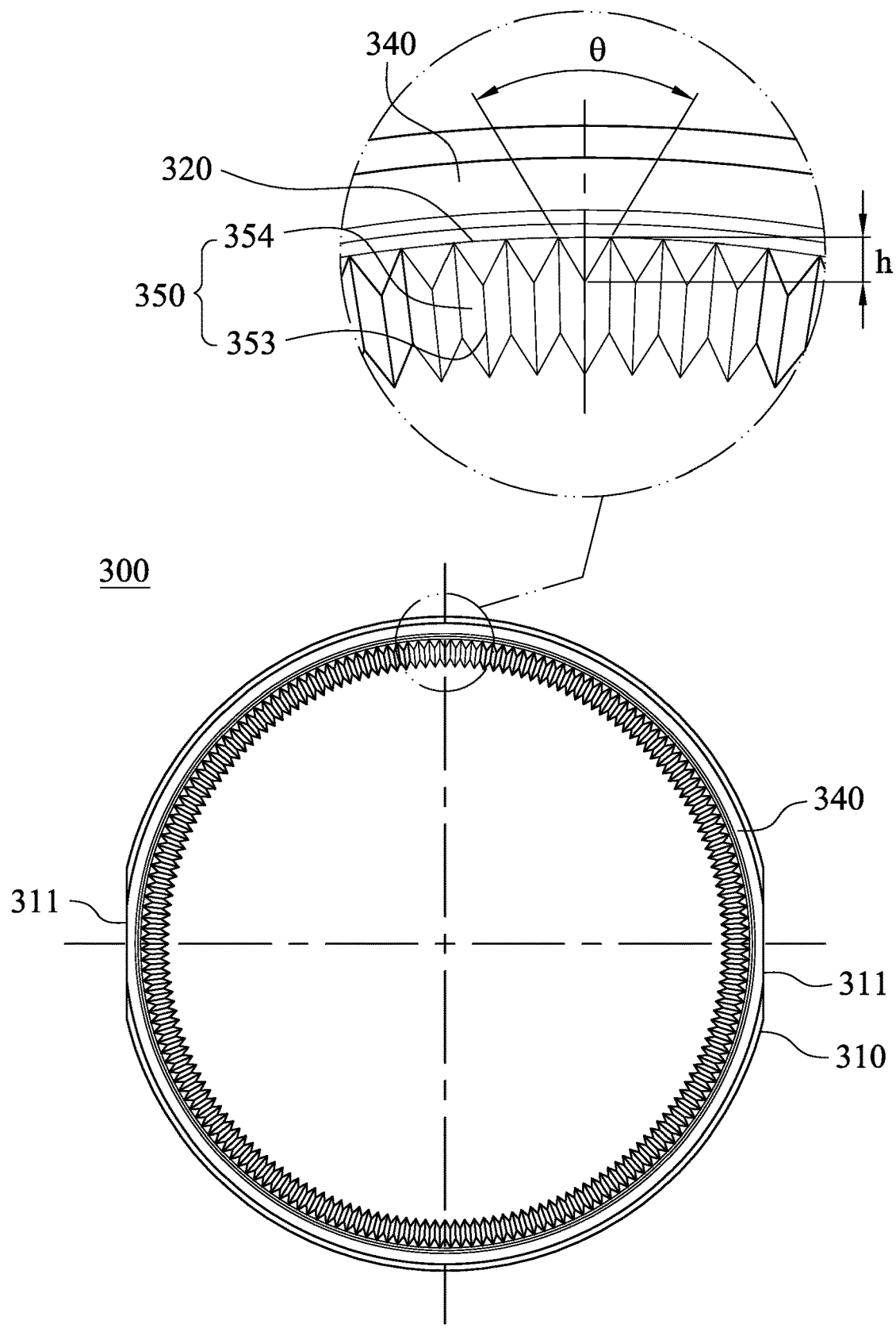
FIG. 3B is a plane view of the annular optical element according to the 3rd embodiment.

FIG. 3A is a schematic view of an annular optical element 300 according to the 3rd embodiment of the present disclosure, and FIG. 3B is a plane view of the annular optical element 300 according to the 3rd embodiment. In FIG. 3A and FIG. 3B, the annular optical element 300 includes an outer annular surface 310, an inner annular surface 320, a first side surface 330, a second side surface 340 and a plurality of strip-shaped wedge structures 350.

The outer annular surface 310 surrounds a central axis of the annular optical element 300 and includes two shrunk portions 311, wherein the shrunk portions 311 are parts of the outer annular surface 310 closer to the central axis and symmetrically disposed around the central axis.

In FIG. 3A, the inner annular surface 320 surrounds the central axis of the annular optical element 300 and is closer to the central axis than the outer annular surface 310. The first side surface 330 connects the outer annular surface 310 and the inner annular surface 320. The second side surface 340 connects the outer annular surface 310 and the inner annular surface 320, wherein the second side surface 340 is disposed correspondingly to the first side surface 330.

Figure 3C:
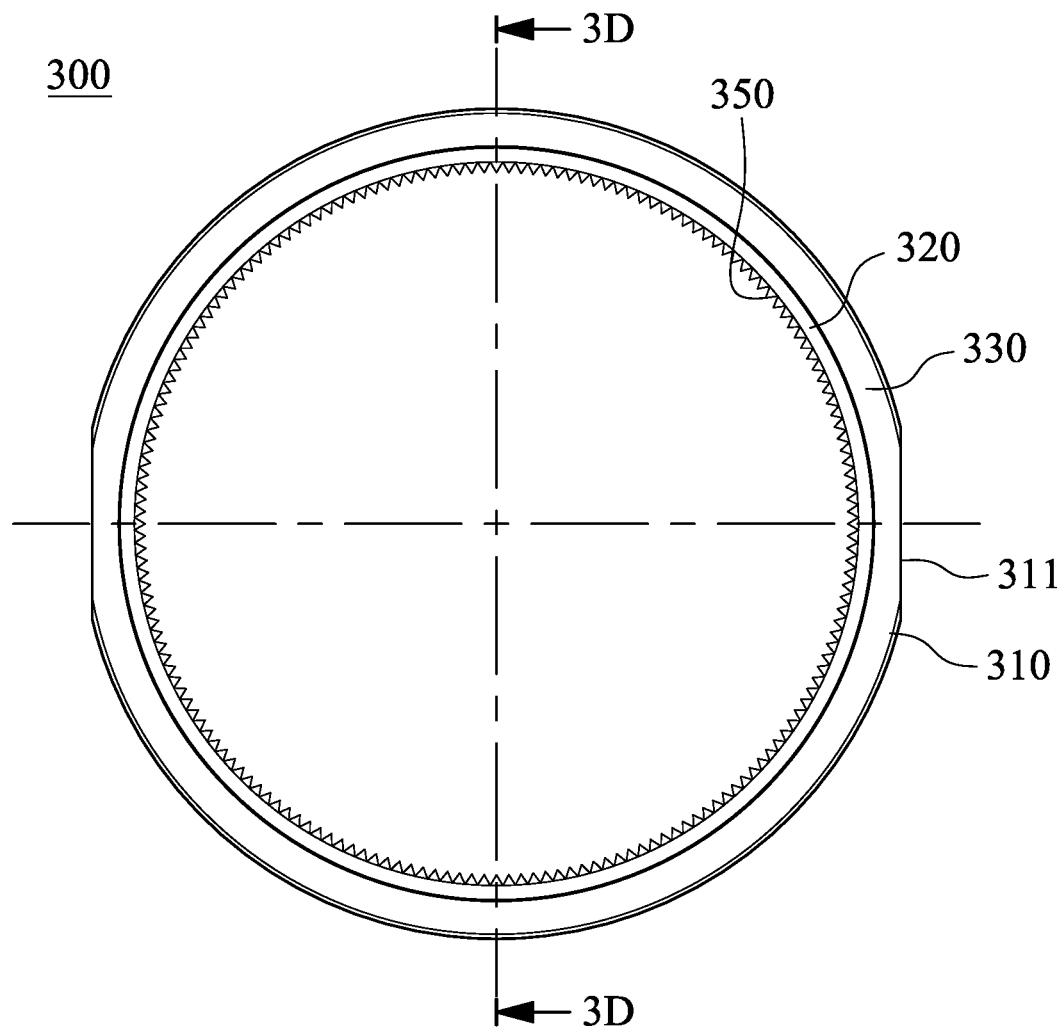
FIG. 3C is another plane view of the annular optical element according to the 3rd embodiment.

FIG. 3C is another plane view of the annular optical element 300 according to the 3rd embodiment. In FIG. 3A to FIG. 3C, the strip-shaped wedge structures 350 are disposed on the inner annular surface 320, wherein each of the strip-shaped wedge structures 350 is disposed along a direction from the first side surface 330 towards the second side surface 340. The inner annular surface 320 has a circumferential direction around the central axis of the annular optical element 300. The strip-shaped wedge structures 350 with the same geometric structures are disposed on the inner annular surface 320, and regularly arranged with the same spaces along the circumferential direction of the inner annular surface 320. Furthermore, each of the strip-shaped wedge structures 350 includes an acute end 353 and a tapered portion 354 connecting the inner annular surface 320 and the acute end 353. The tapered portion 354 is tapered from the inner annular surface 320 towards the central axis of the annular optical element 300, so that the tapered portion 354 is tapered from the inner annular surface 320 to the acute end 353.

In detail, the annular optical element 300 with the strip-shaped wedge structures 350 is formed integrally. A number of the strip-shaped wedge structures 350 is 180, wherein the strip-shaped wedge structures 350 with the same geometric structures are disposed on the inner annular surface 320, and regularly arranged with the same spaces along the circumferential direction of the inner annular surface 320.

In FIG. 3B and FIG. 3C, a cross-section orthogonal to the central axis of each of the strip-shaped wedge structures 350 is isosceles triangle. The inner annular surface 320 has a zigzag shape.

In FIG. 3A and FIG. 3B, each of the strip-shaped wedge structures 350 has even height. That is, for each of the strip-shaped wedge structures 350, heights from a side near the first side surface 330 to a side near the second side surface 340 are approximating to each other. An entire surface of the acute end 353 and an entire surface of the tapered section 354 of each of the strip-shaped wedge structures 350 are both smooth surfaces. The second side surface 340 of the annular optical element 300 includes a recessed portion 342 connected to the outer annular surface 310.

Figure 3D:
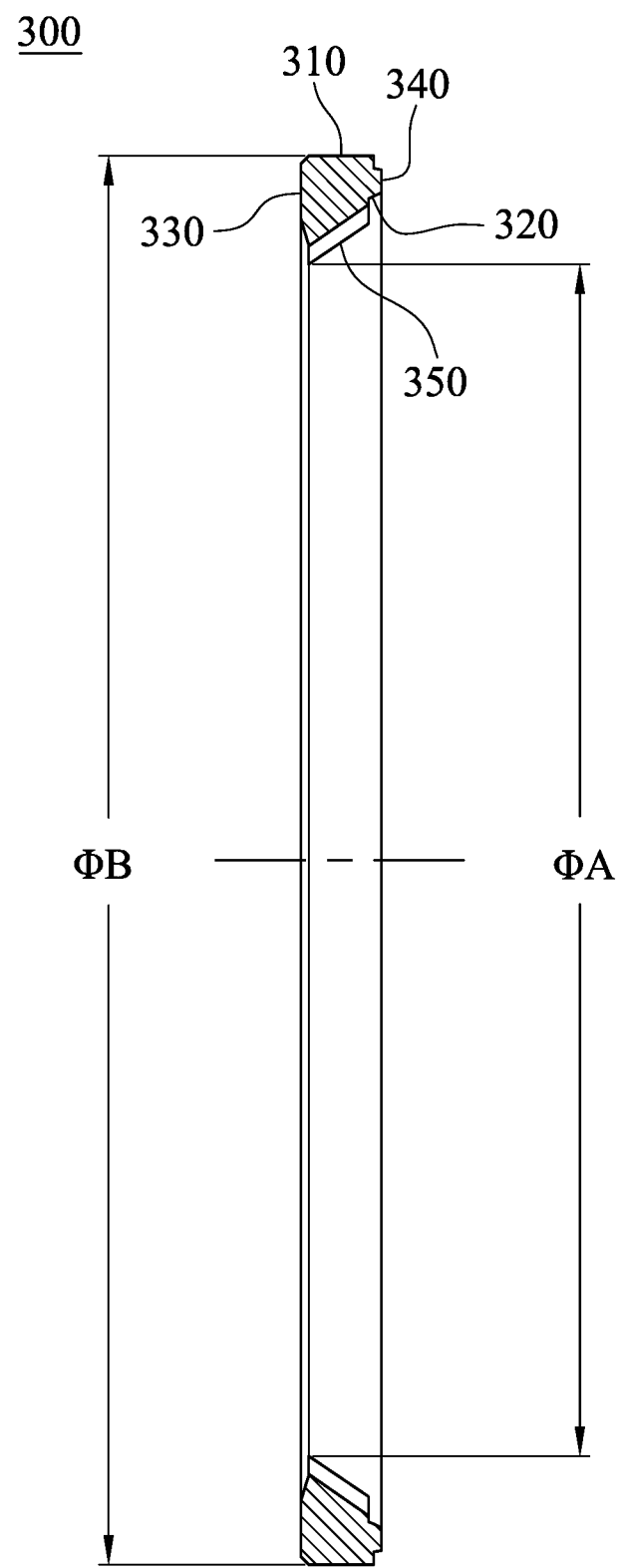
FIG. 3D is a cross-sectional view along line 3D-3D of FIG. 3C.

FIG. 3D is a cross-sectional view along line 3D-3D of FIG. 3C. The data of the parameters θ, h, ϕA, ϕB and ϕA/ϕB of the annular optical element 300 according to the 3rd embodiment of the present disclosure are listed in the following Table 3, wherein the parameters are also shown as FIG. 3B and FIG. 3D. The definitions of these parameters shown in Table 3 are the same as those stated in the annular optical element 100 of the 1st embodiment with corresponding values for the annular optical element 300.

TABLE 3

| 3rd Embodiment | | | |
|---|---|---|---|
| θ (deg.) | 61.3 | ΦB (mm) | 5.53 |
| h (mm) | 0.076 | ΦA/ΦB | 0.85 |
| ΦA (mm) | 4.68 | | |

4th Embodiment

Figure 4A:
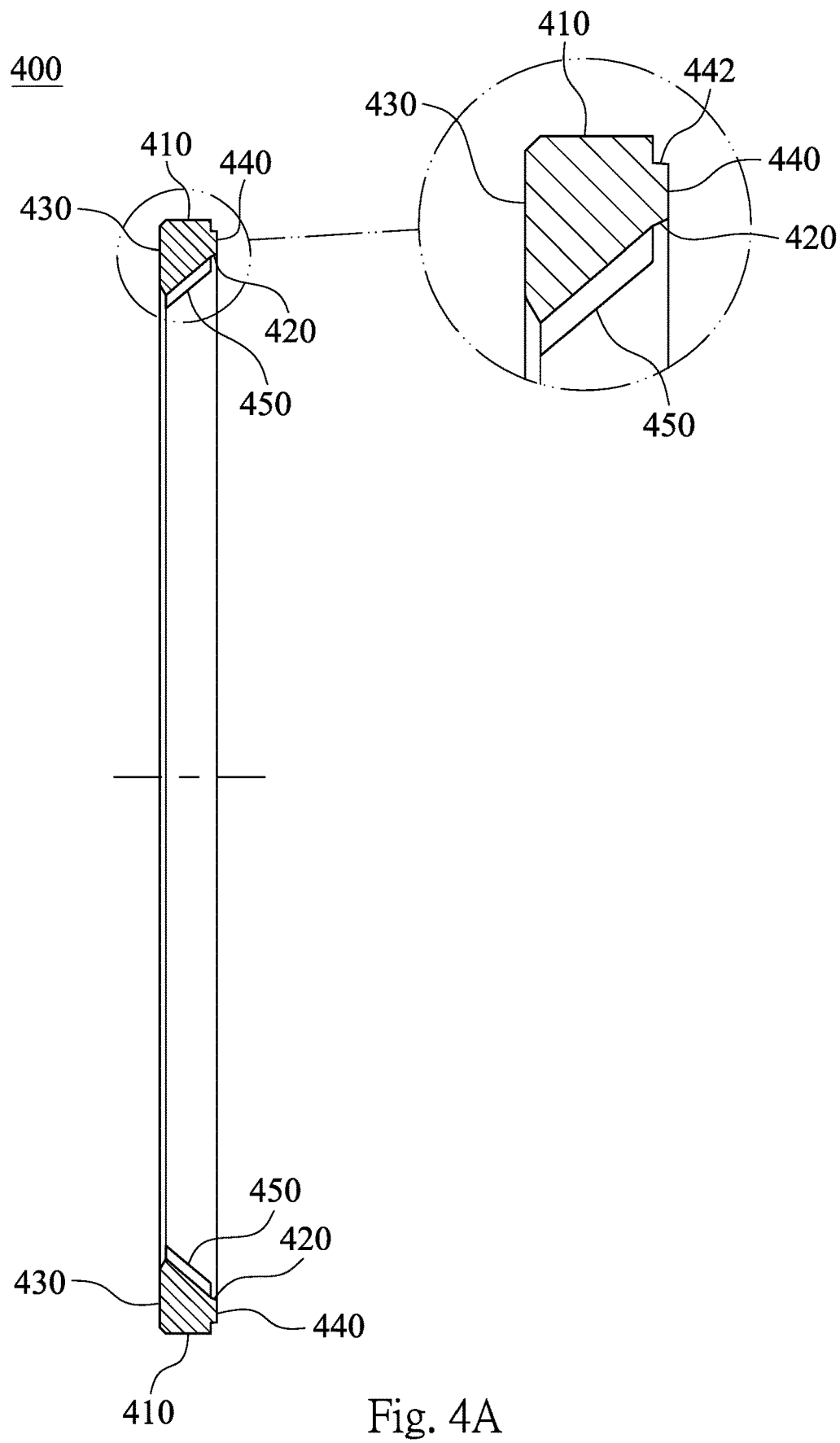
FIG. 4A is a schematic view of an annular optical element according to the 4th embodiment of the present disclosure.
Figure 4B:
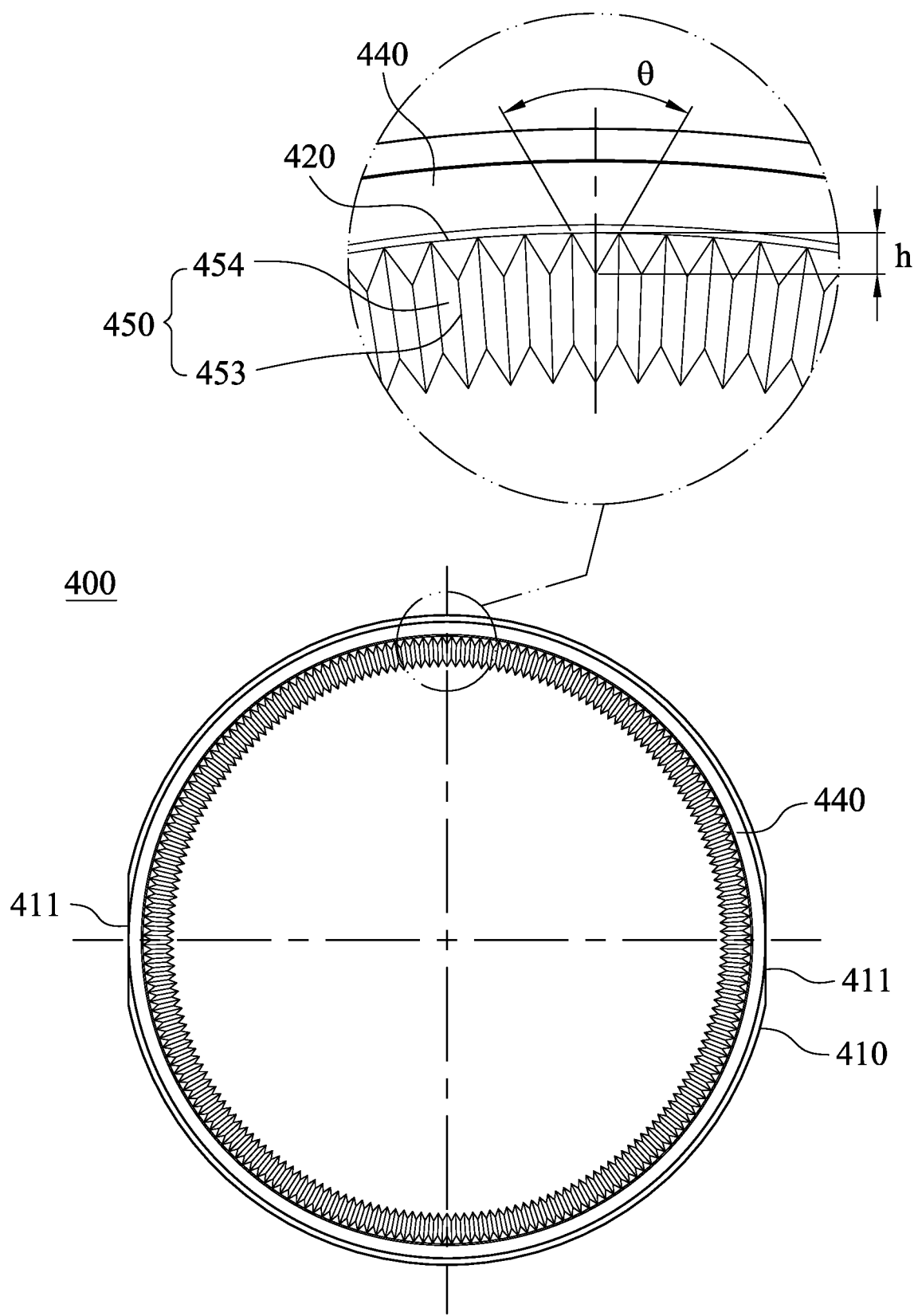
FIG. 4B is a plane view of the annular optical element according to the 4th embodiment.

FIG. 4A is a schematic view of an annular optical element 400 according to the 4th embodiment of the present disclosure, and FIG. 4B is a plane view of the annular optical element 400 according to the 4th embodiment. In FIG. 4A and FIG. 4B, the annular optical element 400 includes an outer annular surface 410, an inner annular surface 420, a first side surface 430, a second side surface 440 and a plurality of strip-shaped wedge structures 450.

The outer annular surface 410 surrounds a central axis of the annular optical element 400 and includes two shrunk portions 411, wherein the shrunk portions 411 are parts of the outer annular surface 410 closer to the central axis and symmetrically disposed around the central axis.

In FIG. 4A, the inner annular surface 420 surrounds the central axis of the annular optical element 400 and is closer to the central axis than the outer annular surface 410. The first side surface 430 connects the outer annular surface 410 and the inner annular surface 420. The second side surface 440 connects the outer annular surface 410 and the inner annular surface 420, wherein the second side surface 440 is disposed correspondingly to the first side surface 430.

Figure 4C:
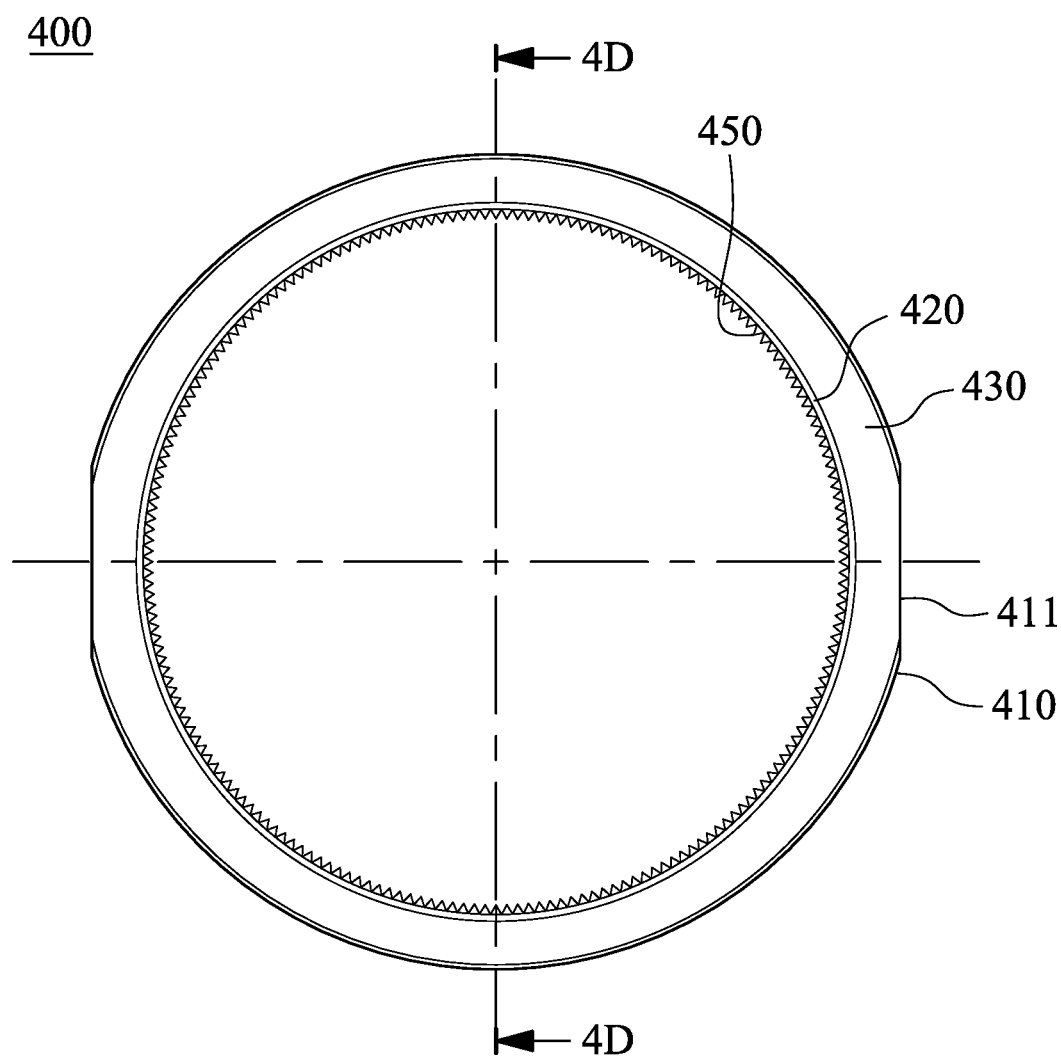
FIG. 4C is another plane view of the annular optical element according to the 4th embodiment.

FIG. 4C is another plane view of the annular optical element 400 according to the 4th embodiment. In FIG. 4A to FIG. 4C, the strip-shaped wedge structures 450 are disposed on the inner annular surface 420, wherein each of the strip-shaped wedge structures 450 is disposed along a direction from the first side surface 430 towards the second side surface 440. The inner annular surface 420 has a circumferential direction around the central axis of the annular optical element 400. The strip-shaped wedge structures 450 with the same geometric structures are disposed on the inner annular surface 420, and regularly arranged with the same spaces along the circumferential direction of the inner annular surface 420. Furthermore, each of the strip-shaped wedge structures 450 includes an acute end 453 and a tapered portion 454 connecting the inner annular surface 420 and the acute end 453. The tapered portion 454 is tapered from the inner annular surface 420 towards the central axis of the annular optical element 400, so that the tapered portion 454 is tapered from the inner annular surface 420 to the acute end 453.

In detail, the annular optical element 400 with the strip-shaped wedge structures 450 is formed integrally. A number of the strip-shaped wedge structures 450 is 200, wherein the strip-shaped wedge structures 450 with the same geometric structures are disposed on the inner annular surface 420, and regularly arranged with the same spaces along the circumferential direction of the inner annular surface 420.

In FIG. 4B and FIG. 4C, a cross-section orthogonal to the central axis of each of the strip-shaped wedge structures 450 is isosceles triangle. The inner annular surface 420 has a zigzag shape.

In FIG. 4A and FIG. 4B, each of the strip-shaped wedge structures 450 has even height. That is, for each of the strip-shaped wedge structures 450, heights from a side near the first side surface 430 to a side near the second side surface 440 are approximating to each other. An entire surface of the acute end 453 and an entire surface of the tapered section 454 of each of the strip-shaped wedge structures 450 are both smooth surfaces. The second side surface 440 of the annular optical element 400 includes a recessed portion 442 connected to the outer annular surface 410.

Figure 4D:
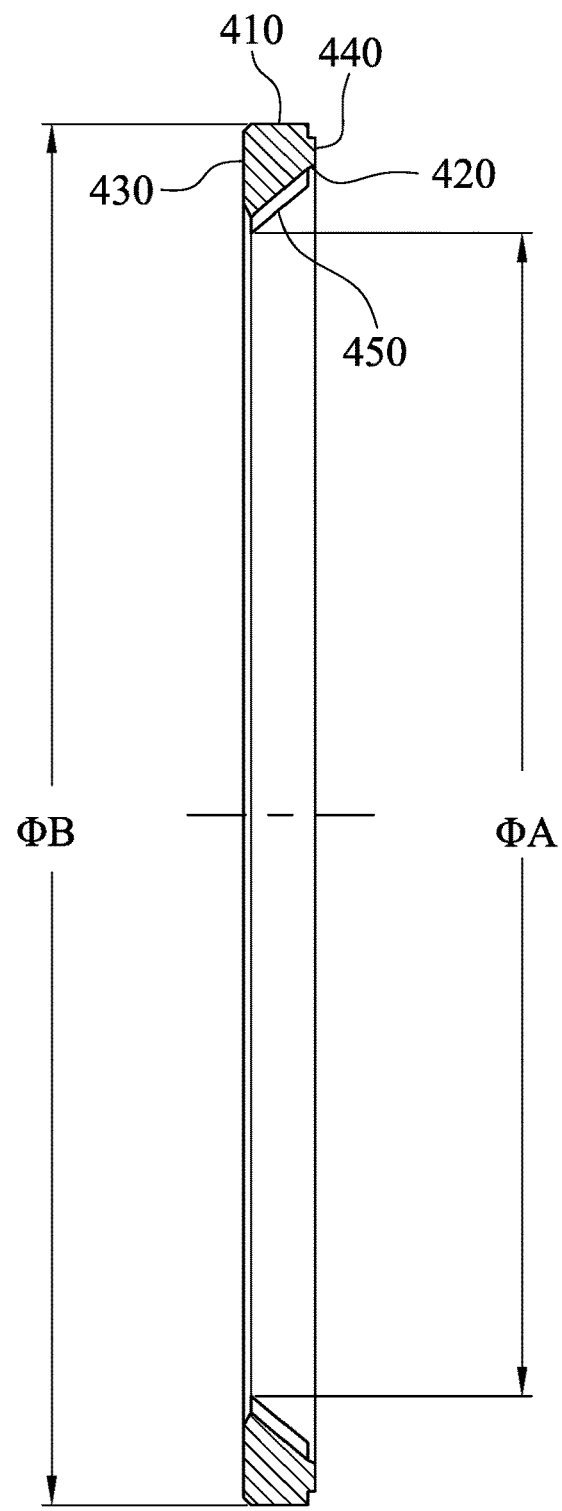
FIG. 4D is a cross-sectional view along line 4D-4D of FIG. 4C.

FIG. 4D is a cross-sectional view along line 4D-4D of FIG. 4C. The data of the parameters θ, h, ϕA, ϕB and ϕA/ϕB of the annular optical element 400 according to the 4th embodiment of the present disclosure are listed in the following Table 4, wherein the parameters are also shown as FIG. 4B and FIG. 4D. The definitions of these parameters shown in Table 4 are the same as those stated in the annular optical element 100 of the 1st embodiment with corresponding values for the annular optical element 400.

TABLE 4

| 4th Embodiment | | | |
|---|---|---|---|
| θ (deg.) | 60 | ΦB (mm) | 5.43 |
| h (mm) | 0.069 | ΦA/ΦB | 0.84 |
| ΦA (mm) | 4.57 | | |

5th Embodiment

Figure 5A:
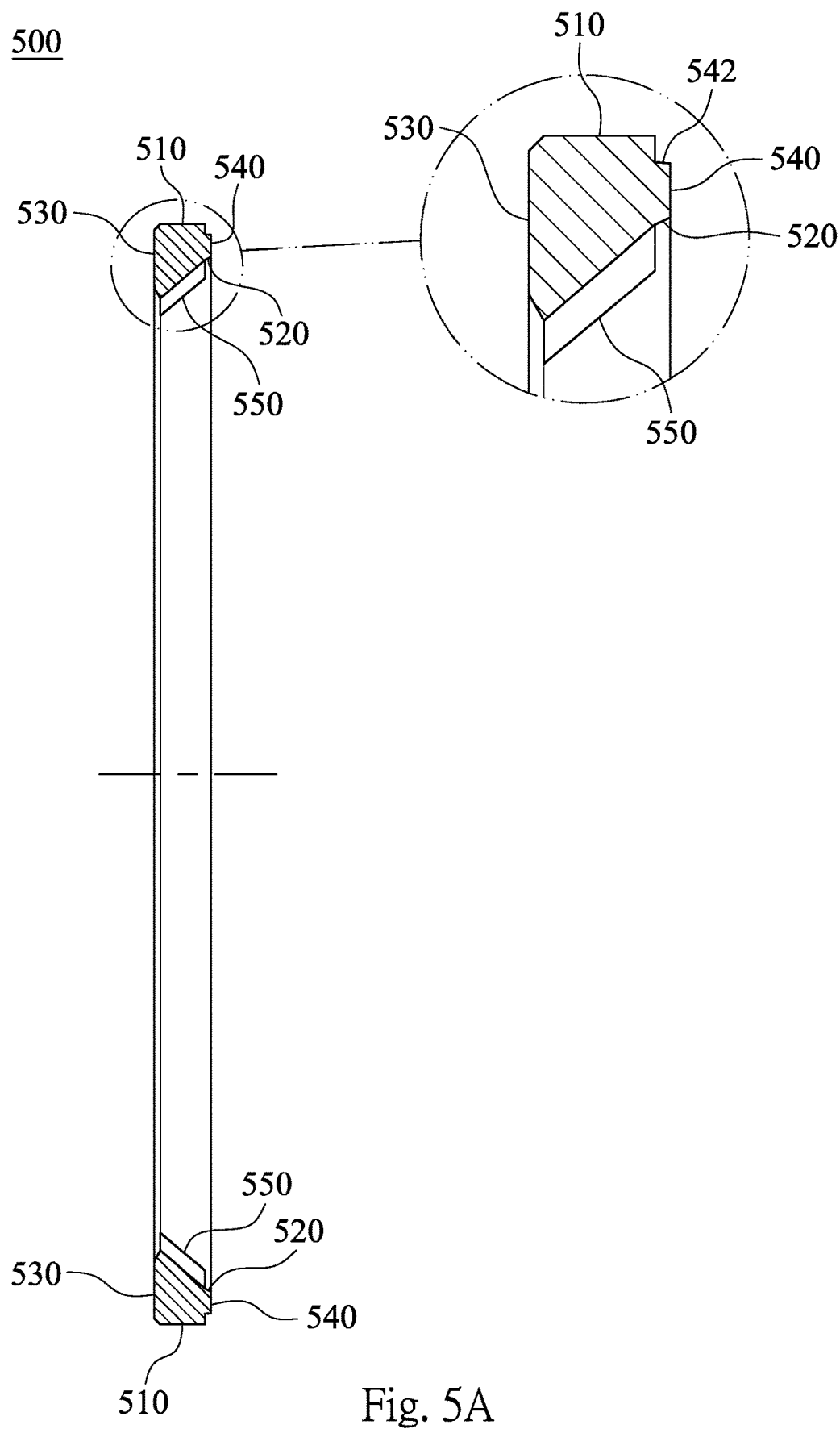
FIG. 5A is a schematic view of an annular optical element according to the 5th embodiment of the present disclosure.
Figure 5B:
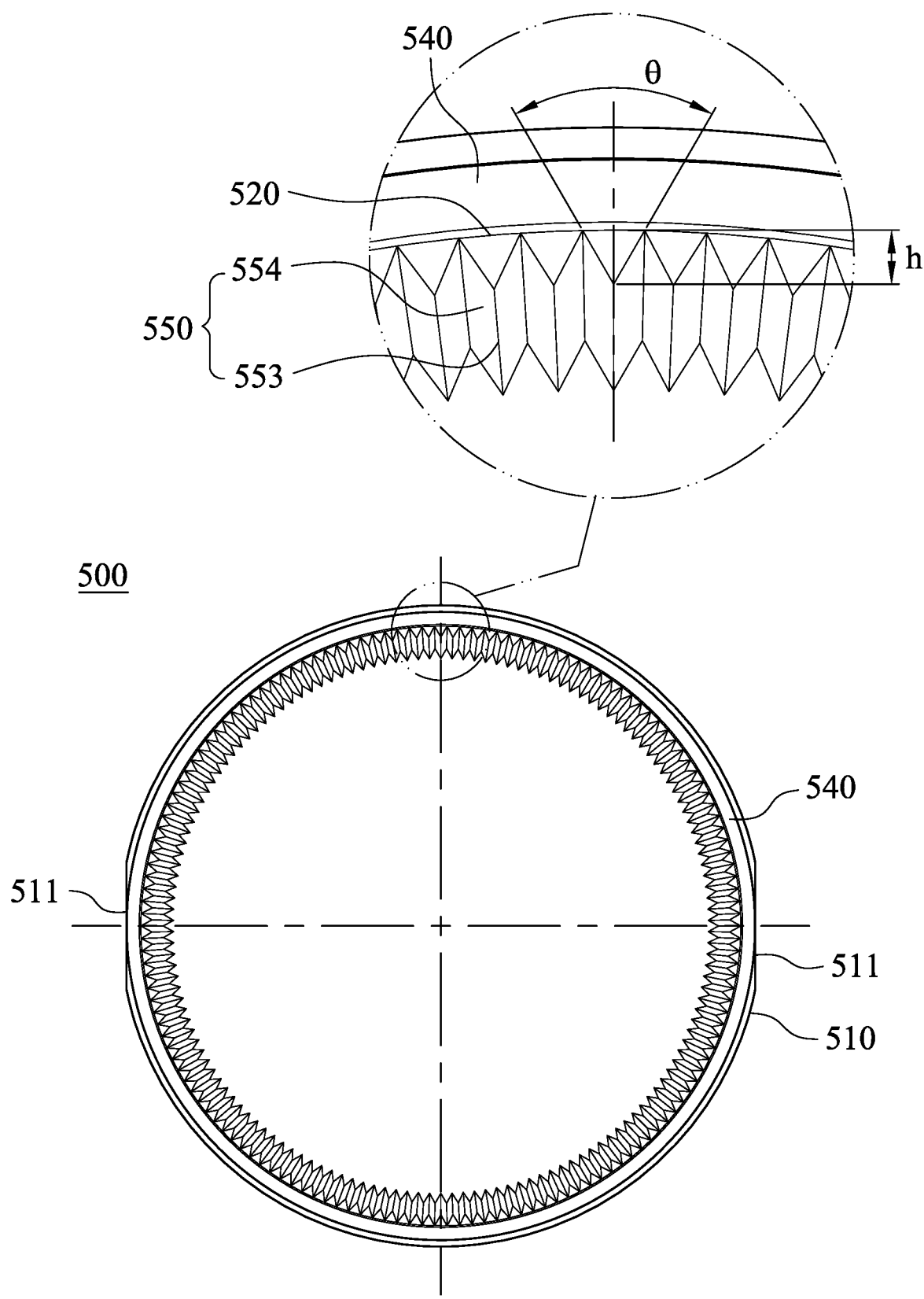
FIG. 5B is a plane view of the annular optical element according to the 5th embodiment.

FIG. 5A is a schematic view of an annular optical element 500 according to the 5th embodiment of the present disclosure, and FIG. 5B is a plane view of the annular optical element 500 according to the 5th embodiment. In FIG. 5A and FIG. 5B, the annular optical element 500 includes an outer annular surface 510, an inner annular surface 520, a first side surface 530, a second side surface 540 and a plurality of strip-shaped wedge structures 550.

The outer annular surface 510 surrounds a central axis of the annular optical element 500 and includes two shrunk portions 511, wherein the shrunk portions 511 are parts of the outer annular surface 510 closer to the central axis and symmetrically disposed around the central axis.

In FIG. 5A, the inner annular surface 520 surrounds the central axis of the annular optical element 500 and is closer to the central axis than the outer annular surface 510. The first side surface 530 connects the outer annular surface 510 and the inner annular surface 520. The second side surface 540 connects the outer annular surface 510 and the inner annular surface 520, wherein the second side surface 540 is disposed correspondingly to the first side surface 530.

Figure 5C:
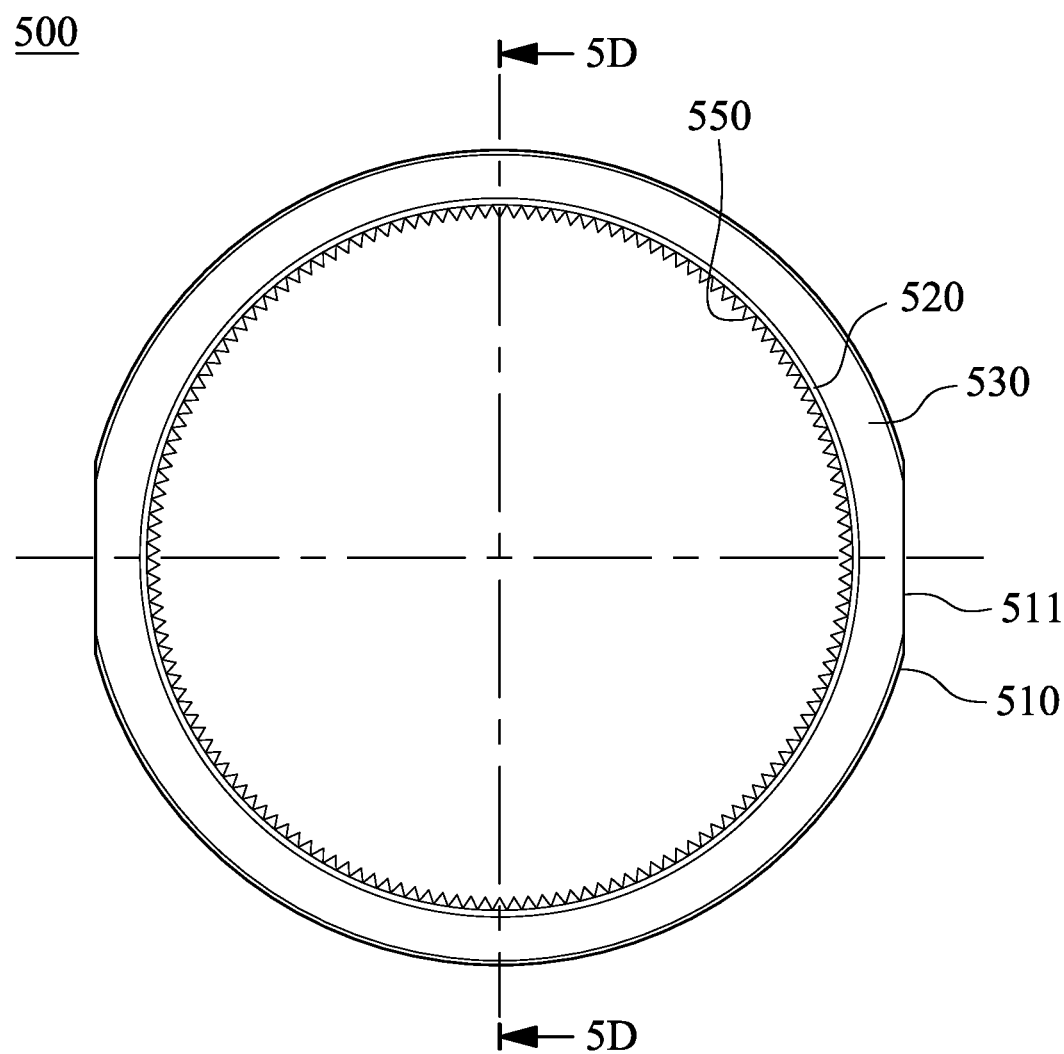
FIG. 5C is another plane view of the annular optical element according to the 5th embodiment.

FIG. 5C is another plane view of the annular optical element 500 according to the 5th embodiment. In FIG. 5A to FIG. 5C, the strip-shaped wedge structures 550 are disposed on the inner annular surface 520, wherein each of the strip-shaped wedge structures 550 is disposed along a direction from the first side surface 530 towards the second side surface 540. The inner annular surface 520 has a circumferential direction around the central axis of the annular optical element 500. The strip-shaped wedge structures 550 with the same geometric structures are disposed on the inner annular surface 520, and regularly arranged with the same spaces along the circumferential direction of the inner annular surface 520. Furthermore, each of the strip-shaped wedge structures 550 includes an acute end 553 and a tapered portion 554 connecting the inner annular surface 520 and the acute end 553. The tapered portion 554 is tapered from the inner annular surface 520 towards the central axis of the annular optical element 500, so that the tapered portion 554 is tapered from the inner annular surface 520 to the acute end 553.

In detail, the annular optical element 500 with the strip-shaped wedge structures 550 is formed integrally. A number of the strip-shaped wedge structures 550 is 150, wherein the strip-shaped wedge structures 550 with the same geometric structures are disposed on the inner annular surface 520, and regularly arranged with the same spaces along the circumferential direction of the inner annular surface 520.

In FIG. 5B and FIG. 5C, a cross-section orthogonal to the central axis of each of the strip-shaped wedge structures 550 is isosceles triangle. The inner annular surface 520 has a zigzag shape.

In FIG. 5A and FIG. 5B, each of the strip-shaped wedge structures 550 has even height. That is, for each of the strip-shaped wedge structures 550, heights from a side near the first side surface 530 to a side near the second side surface 540 are approximating to each other. An entire surface of the acute end 553 and an entire surface of the tapered section 554 of each of the strip-shaped wedge structures 550 are both smooth surfaces. The second side surface 540 of the annular optical element 500 includes a recessed portion 542 connected to the outer annular surface 510.

Figure 5D:
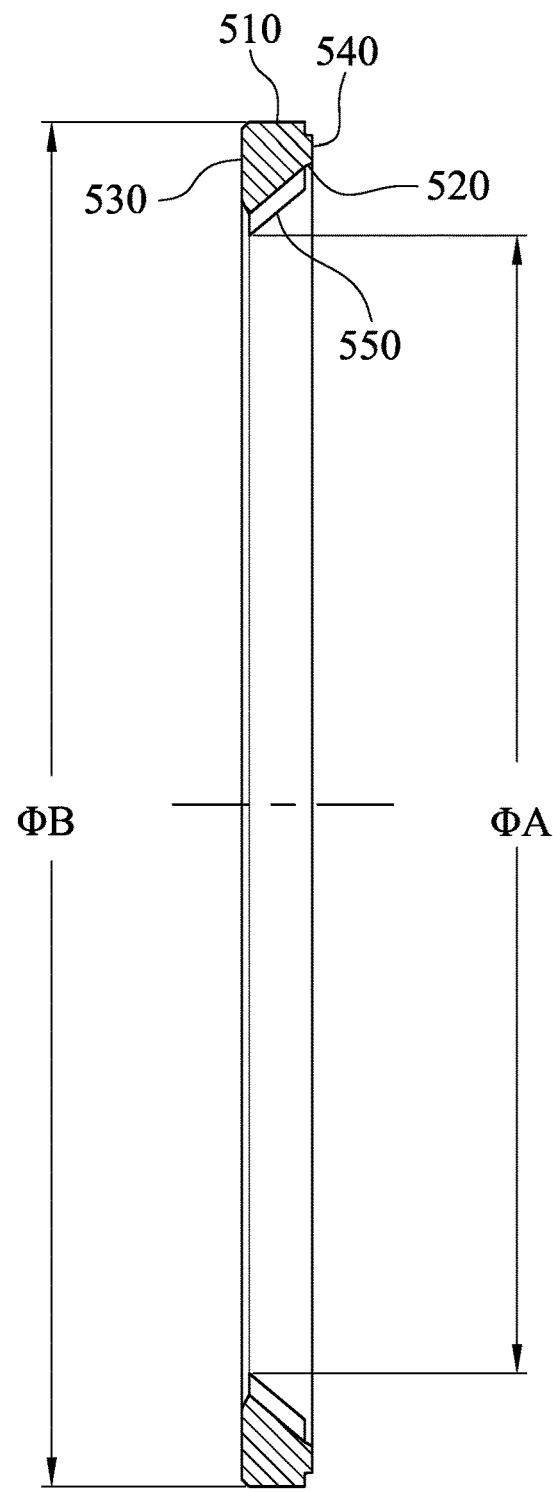
FIG. 5D is a cross-sectional view along line 5D-5D of FIG. 5C.

FIG. 5D is a cross-sectional view along line 5D-5D of FIG. 5C. The data of the parameters θ, h, ϕA, ϕB and ϕA/ϕB of the annular optical element 500 according to the 5th embodiment of the present disclosure are listed in the following Table 5, wherein the parameters are also shown as FIG. 5B and FIG. 5D. The definitions of these parameters shown in Table 5 are the same as those stated in the annular optical element 100 of the 1st embodiment with corresponding values for the annular optical element 500.

TABLE 5

| 5th Embodiment | | | |
|---|---|---|---|
| θ (deg.) | 60 | ϕB (mm) | 5.43 |
| h (mm) | 0.093 | ϕA/ϕB | 0.83 |
| ϕA (mm) | 4.53 | | |

6th Embodiment

Figure 6:
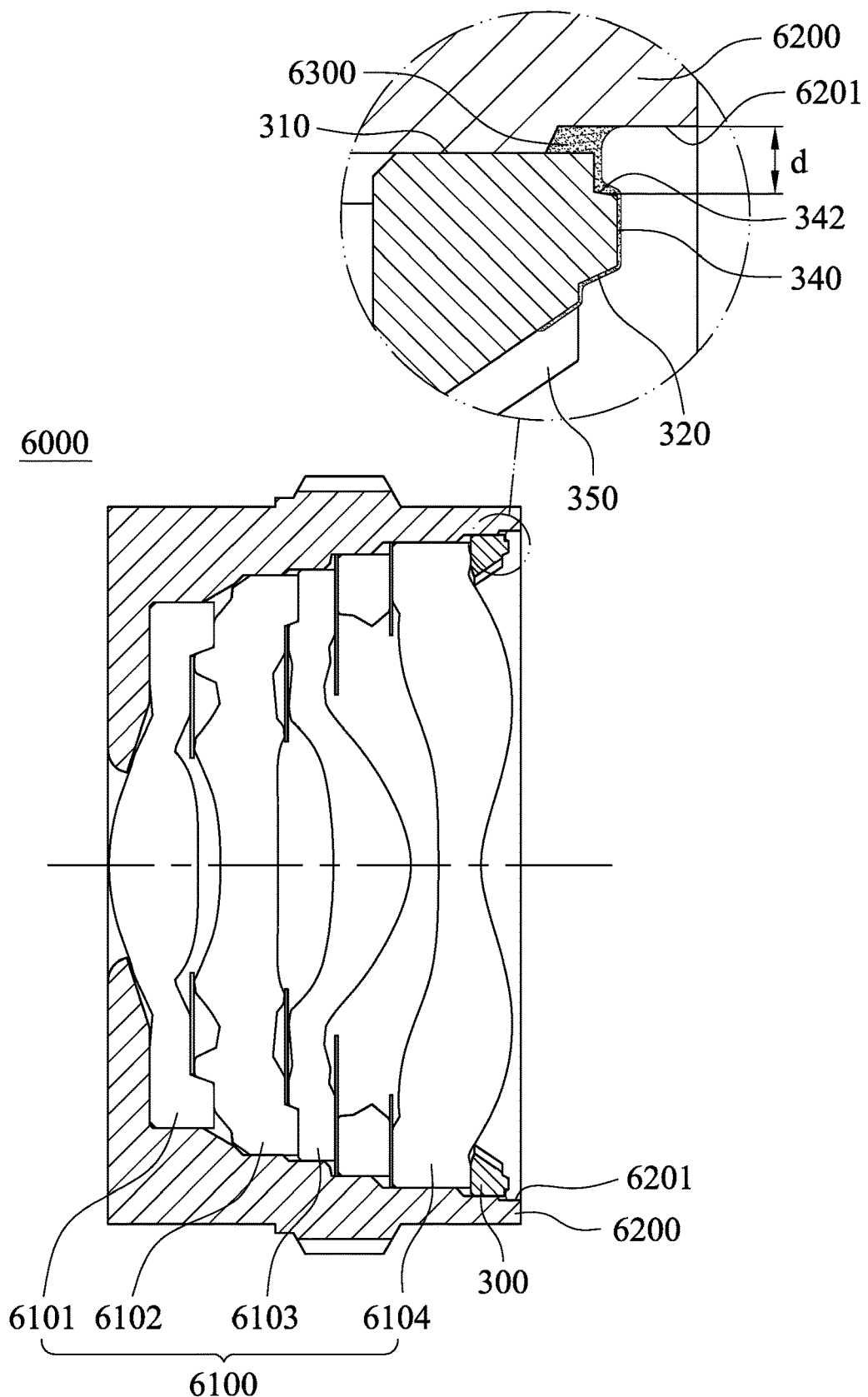
FIG. 6 is a schematic view of an imaging lens module according to the 6th embodiment of the present disclosure.

FIG. 6 is a schematic view of an imaging lens module 6000 according to the 6th embodiment of the present disclosure. In FIG. 6, the imaging lens module 6000 includes the annular optical element 300 in the aforementioned 3rd embodiment and an optical lens assembly 6100, wherein the optical lens assembly 6100 includes a plurality of lens elements (6101-6104), and the annular optical element 300 is connected to at least one of the lens elements.

In FIG. 3A to FIG. 3C and FIG. 6, the annular optical element 300 includes the outer annular surface 310, the inner annular surface 320, the first side surface 330, the second side surface 340 and the strip-shaped wedge structures 350. The outer annular surface 310 surrounds the central axis of the annular optical element 300 (i.e. an optical axis of the imaging lens module 6000) and includes two shrunk portions 311, wherein the shrunk portions 311 are parts of the outer annular surface 310 closer to the central axis. The inner annular surface 320 surrounds the central axis of the annular optical element 300 and is closer to the central axis than the outer annular surface 310. The first side surface 330 connects the outer annular surface 310 and the inner annular surface 320. The second side surface 340 connects the outer annular surface 310 and the inner annular surface 320, wherein the second side surface 340 is disposed correspondingly to the first side surface 330. The strip-shaped wedge structures 350 are disposed on the inner annular surface 320, wherein each of the strip-shaped wedge structures 350 is disposed along the direction from the first side surface 330 towards the second side surface 340. Each of the strip-shaped wedge structures 350 includes the acute end 353 and the tapered portion 354 connecting the inner annular surface 320 and the acute end 353. Therefore, it is favorable for effectively attenuating the stray light reflected from the imaging lens module 6000.

Furthermore, in FIG. 6, the imaging lens module 6000 can be applied to an electronic device. The imaging lens module 6000 can further include a plastic barrel 6200, wherein the optical lens assembly 6100 and the annular optical element 300 can be disposed in the plastic barrel 6200.

In the 6th embodiment, the optical lens assembly 6100 includes the lens elements 6101, 6102, 6103 and 6104 in order from a side near an imaged object (not shown herein) to a side near an image surface (not shown herein). In addition, the imaging lens module 6000 further includes the annular optical element 300 and other optical elements (their reference numerals are omitted) such as spacers, light blocking sheets and etc., wherein the lens elements 6101-6104 are respectively abutted with the aforementioned optical elements (including the annular optical element 300) to be disposed in the plastic barrel 6200.

The first side surface 330 of the annular optical element 300 can be connected to at least one of the lens elements (6101-6104). The second side surface 340 is farther from the imaged object than the first side surface 330 and can be not connected to any of the lens elements. In the 6th embodiment, the annular optical element 300 is farther from the imaged object (i.e. closer to the image surface) than the lens elements (6101-6104), wherein the second side surface 340 is farther from the imaged object than the first side surface 330, the first side surface 330 is connected to the lens elements 6104, and the second side surface 340 is not connected to any of the lens elements (6101-6104). Therefore, it is favorable for further effectively attenuating the stray light reflected from the imaging lens module 6000.

The annular optical element 300 with the strip-shaped wedge structures 350 can be formed integrally. Therefore, it is favorable for producing the strip-shaped wedge structures 350 more easily. The other details of the annular optical element 300 have been described in the foregoing paragraphs of the 3rd embodiment and will not be described again herein.

In detail, in FIG. 3B and FIG. 3C, every two strip-shaped wedge structures 350 adjacent to each other can be connected to each other. That is, there is no gap and no inner annular surface 320 explored between every two strip-shaped wedge structures 350 adjacent to each other. Therefore, it is favorable for densely arranging the strip-shaped wedge structures 350 so as to enhance the effect of absorbing the stray light of the imaging lens module 6000. In the 6th embodiment, every two strip-shaped wedge structures 350 adjacent to each other are connected to each other.

In FIG. 3B, when the angle of each of the acute ends 353 is θ, the following condition can be satisfied: 35 degrees<θ<90 degrees. Therefore, it is favorable for absorbing the stray light of the imaging lens module 6000. Preferably, the following condition can be satisfied: 45 degrees<θ<75 degrees. Therefore, it is favorable for maintaining the structural quality of the imaging lens module 6000 in mass production.

When the distance between the inner annular surface 320 and the acute end 353 of each of the strip-shaped wedge structures 350 is h, the following condition can be satisfied: 0.03 mm<h<0.25 mm. Therefore, it is favorable for obtaining the deeper structural depth of the strip-shaped wedge structures 350 so as to enhance the effect of absorbing the stray light. Preferably, the following condition can be satisfied: 0.04 mm<h<0.15 mm. Therefore, it is favorable for maintaining the effect of absorbing the stray light and satisfying the requirements of mass production of the imaging lens module 6000.

In FIG. 3A, each of the strip-shaped wedge structures 350 can have even height. Therefore, it is favorable for simplifying the mold machining process of the strip-shaped wedge structures 350. In the 6th embodiment, each of the strip-shaped wedge structures 350 has even height.

In FIG. 3B, the entire surface of the acute end 353 and the entire surface of the tapered section 354 of each of the strip-shaped wedge structures 350 can be both smooth surfaces. Therefore, it is favorable for reducing process steps of the mold machining of the strip-shaped wedge structures 350 due to without the atomization process.

In FIG. 3D, when the minimum inner diameter formed by the strip-shaped wedge structures 350 of the annular optical element 300 is φA, and the maximum outer diameter of the outer annular surface 310 is φB, the following condition can be satisfied: 0.75<φA/φB<1.0. Therefore, it is favorable for obtaining the greater light output range and preventing from excessively blocking light of the annular optical element 300.

In FIG. 3A and FIG. 6, the plastic barrel 6200 can include an inner surface 6201 connected to the annular optical element 300. The second side surface 340 of the annular optical element 300 can include the recessed portion 342 connected to the outer annular surface 310. An air gap can be between the recessed portion 342 and the inner surface 6201 of the plastic barrel 6200. Therefore, it is favorable for preventing excessive compression between the annular optical element 300 and the inner surface 6201 of the plastic barrel 6200. In addition, the inner surface 6201 can include a plurality of surfaces parallel to the optical axis and a plurality of surfaces inclined to the optical axis, wherein the surfaces inclined to the optical axis are neither parallel nor orthogonal to the optical axis. In the 6th embodiment, the plastic barrel 6200 includes the inner surface 6201, wherein one of the surfaces parallel to the optical axis of the inner surface 6201 is connected to the annular optical element 300. The second side surface 340 of the annular optical element 300 includes the recessed portion 342 connected to the outer annular surface 310. The air gap is between the recessed portion 342 and the inner surface 6201 of the plastic barrel 6200.

In FIG. 6, the imaging lens module 6000 can further include a glue material 6300 connected to the recessed portion 342 of the annular optical element 300. Therefore, the recessed portion 342 can be used as an accommodating groove of the glue material 6300, so that the structure of the imaging lens module 6000 could be firmer. In the 6th embodiment, the imaging lens module 6000 further includes the glue material 6300, wherein the glue material 6300 connects the recessed portion 342 of the annular optical element 300 and the inner surface 6201 of the plastic barrel 6200.

When a maximum distance orthogonal to the central axis between the recessed portion 342 and the inner surface 6201 of the plastic barrel 6200 is d, the following condition can be satisfied: 0.01 mm<d<0.20 mm. Therefore, it is favorable for the recessed portion 342 to have a proper size so as to control the flow quantity of the glue material 6300.

The data of the aforementioned parameters of the imaging lens module 6000 according to the 6th embodiment of the present disclosure are listed in the following Table 6, wherein the parameters are also shown as FIG. 3B, FIG. 3D and FIG. 6.

TABLE 6

| 6th Embodiment | | | |
| --- | --- | --- | --- |
| θ (deg.) | 61.3 | ΦB (mm) | 5.53 |
| h (mm) | 0.076 | ΦA/ΦB | 0.85 |
| ΦA (mm) | 4.68 | d (mm) | 0.087 |

7th Embodiment

Figure 7:
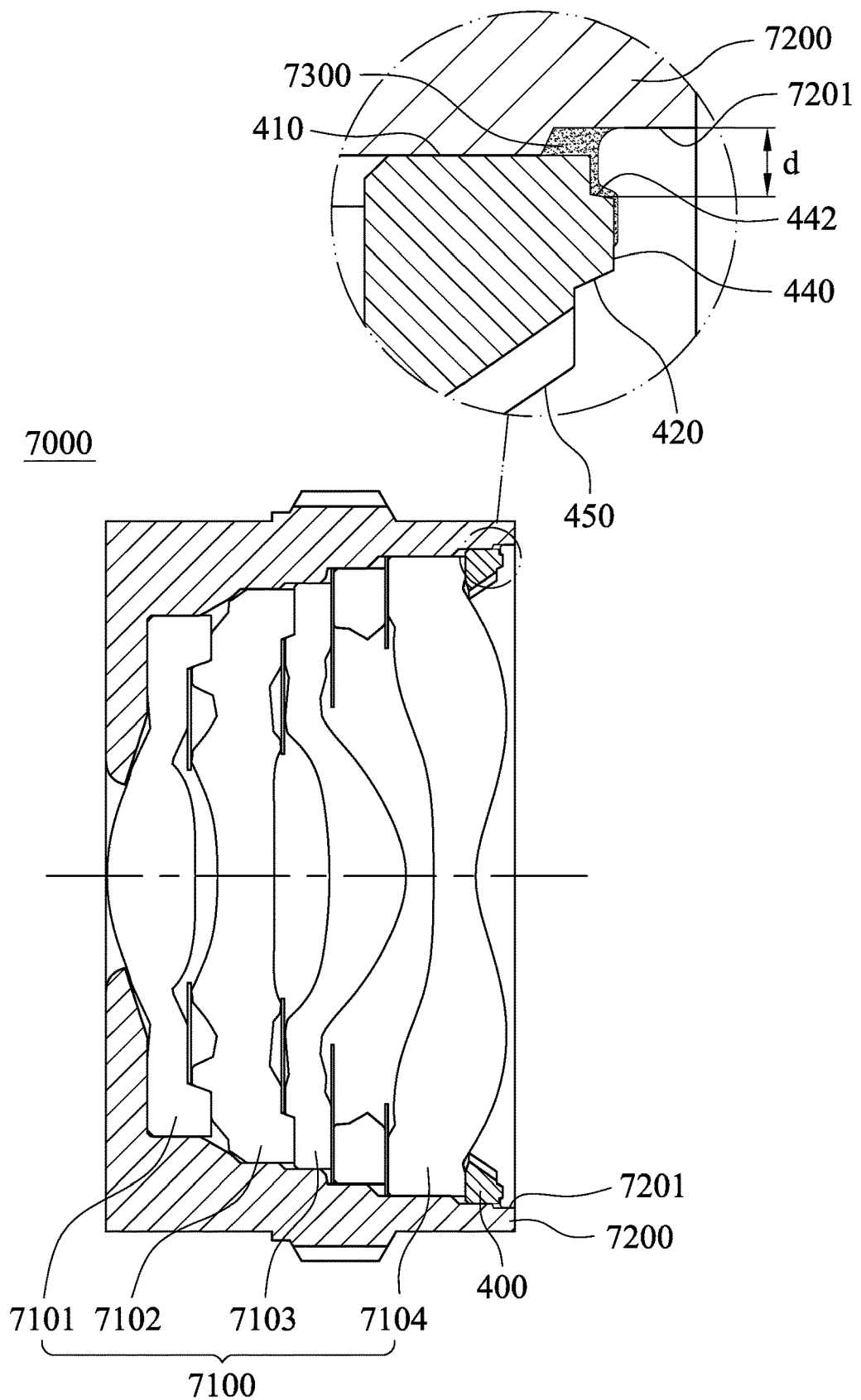
FIG. 7 is a schematic view of an imaging lens module according to the 7th embodiment of the present disclosure.

FIG. 7 is a schematic view of an imaging lens module 7000 according to the 7th embodiment of the present disclosure. In FIG. 7, the imaging lens module 7000 includes the annular optical element 400 in the aforementioned 4th embodiment and an optical lens assembly 7100, wherein the optical lens assembly 7100 includes a plurality of lens elements (7101-7104), and the annular optical element 400 is connected to the lens element 7104.

In FIG. 4A to FIG. 4C and FIG. 7, the annular optical element 400 includes the outer annular surface 410, the inner annular surface 420, the first side surface 430, the second side surface 440 and the strip-shaped wedge structures 450. The outer annular surface 410 surrounds the central axis of the annular optical element 400 (i.e. an optical axis of the imaging lens module 7000) and includes two shrunk portions 411, wherein the shrunk portions 411 are parts of the outer annular surface 410 closer to the central axis. The inner annular surface 420 surrounds the central axis of the annular optical element 400 and is closer to the central axis than the outer annular surface 410. The first side surface 430 connects the outer annular surface 410 and the inner annular surface 420. The second side surface 440 connects the outer annular surface 410 and the inner annular surface 420, wherein the second side surface 440 is disposed correspondingly to the first side surface 430. The strip-shaped wedge structures 450 are disposed on the inner annular surface 420, wherein each of the strip-shaped wedge structures 450 is disposed along the direction from the first side surface 430 towards the second side surface 440. Each of the strip-shaped wedge structures 450 includes the acute end 453 and the tapered portion 454 connecting the inner annular surface 420 and the acute end 453.

Furthermore, in FIG. 7, the imaging lens module 7000 is applied to an electronic device. The imaging lens module 7000 includes a plastic barrel 7200, wherein the optical lens assembly 7100 and the annular optical element 400 are disposed in the plastic barrel 7200. The optical lens assembly 7100 includes the lens elements 7101, 7102, 7103 and 7104 in order from a side near an imaged object (not shown herein) to a side near an image surface (not shown herein). In addition, the imaging lens module 7000 further includes the annular optical element 400 and other optical elements (their reference numerals are omitted) such as spacers, light blocking sheets and etc., wherein the lens elements 7101-7104 are respectively abutted with the aforementioned optical elements (including the annular optical element 400) to be disposed in the plastic barrel 7200.

In the 7th embodiment, the annular optical element 400 is farther from the imaged object (i.e. closer to the image surface) than the lens elements (7101-7104), wherein the second side surface 440 is farther from the imaged object than the first side surface 430, the first side surface 430 is connected to the lens element 7104, and the second side surface 440 is not connected to any of the lens elements (7101-7104). The annular optical element 400 with the strip-shaped wedge structures 450 is formed integrally. The other details of the annular optical element 400 have been described in the foregoing paragraphs of the 4th embodiment and will not be described again herein.

In detail, in FIG. 4B and FIG. 4C, every two strip-shaped wedge structures 450 adjacent to each other are connected to each other. The entire surface of the acute end 453 and the entire surface of the tapered section 454 of each of the strip-shaped wedge structures 450 are both smooth surfaces.

In FIG. 4A and FIG. 7, each of the strip-shaped wedge structures 450 has even height. The plastic barrel 7200 includes an inner surface 7201 connected to the annular optical element 400, wherein one of surfaces parallel to the optical axis of the inner surface 7201 of the plastic barrel 7200 is connected to the annular optical element 400. The second side surface 440 of the annular optical element 400 includes the recessed portion 442 connected to the outer annular surface 410. An air gap is between the recessed portion 442 and the inner surface 7201 of the plastic barrel 7200. The imaging lens module 7000 includes a glue material 7300, wherein the glue material 7300 connects the recessed portion 442 of the annular optical element 400 and the inner surface 7201 of the plastic barrel 7200.

The data of the parameters θ, h, ϕA, ϕB, ϕA/ϕB and d of the imaging lens module 7000 according to the 7th embodiment of the present disclosure are listed in the following Table 7, wherein the parameters are also shown as FIG. 4B, FIG. 4D and FIG. 7. The definitions of these parameters shown in Table 7 are the same as those stated in the imaging lens module 6000 of the 6th embodiment with corresponding values for the imaging lens module 7000.

TABLE 7

7th Embodiment

| θ (deg.) | 60 | ϕB (mm) | 5.43 |
|---|---|---|---|
| h (mm) | 0.069 | ϕA/ϕB | 0.84 |
| ϕA (mm) | 4.57 | d (mm) | 0.087 |

8th Embodiment

Figure 8:
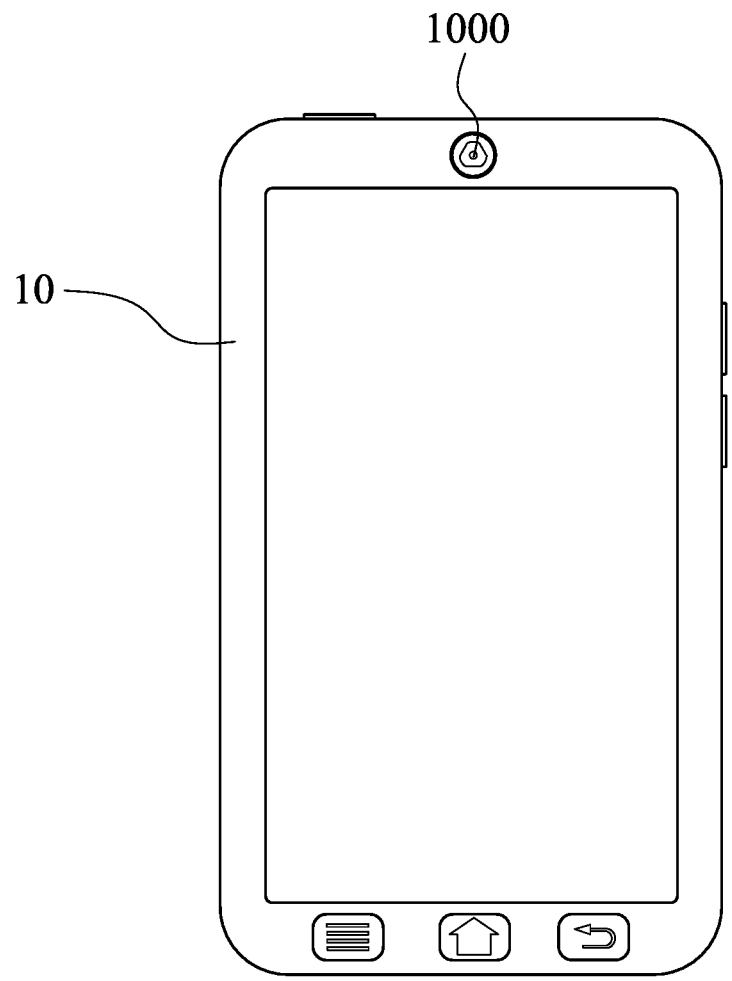
FIG. 8 shows an electronic device according to the 8th embodiment of the present disclosure.

FIG. 8 shows an electronic device 10 according to the 8th embodiment of the present disclosure. The electronic device 10 of the 8th embodiment is a smart phone, wherein the electronic device 10 includes an imaging lens module 1000. The imaging lens module 1000 includes an annular optical element (not shown herein) according to the present disclosure. Therefore, it is favorable for effectively reducing the reflected stray light and enhancing the image quality so as to satisfy the requirements of high-end optical systems with camera functionalities. Furthermore, the electronic device 10 can further include an image sensor (not shown herein), wherein the image sensor is disposed on an image surface (not shown herein) of the imaging lens module 1000. Preferably, the electronic device 10 can further include but not limited to a display, a control unit, a storage unit, a random access memory unit (RAM), a read-only memory unit (ROM) or a combination thereof.

9th Embodiment

Figure 9:
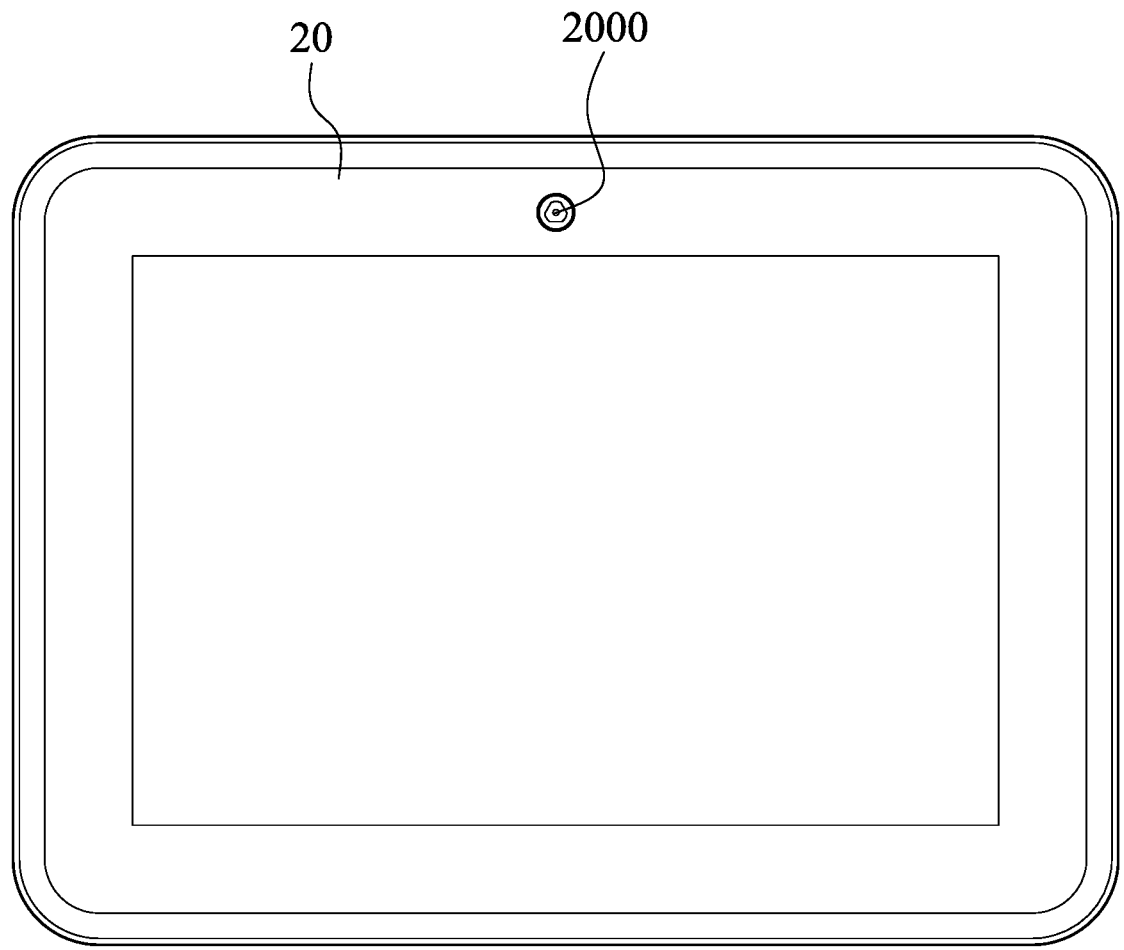
FIG. 9 shows an electronic device according to the 9th embodiment of the present disclosure.

FIG. 9 shows an electronic device 20 according to the 9th embodiment of the present disclosure. The electronic device 20 of the 9th embodiment is a tablet personal computer, wherein the electronic device 20 includes an imaging lens module 2000. The imaging lens module 2000 includes an annular optical element (not shown herein) according to the present disclosure.

10th Embodiment

Figure 10:
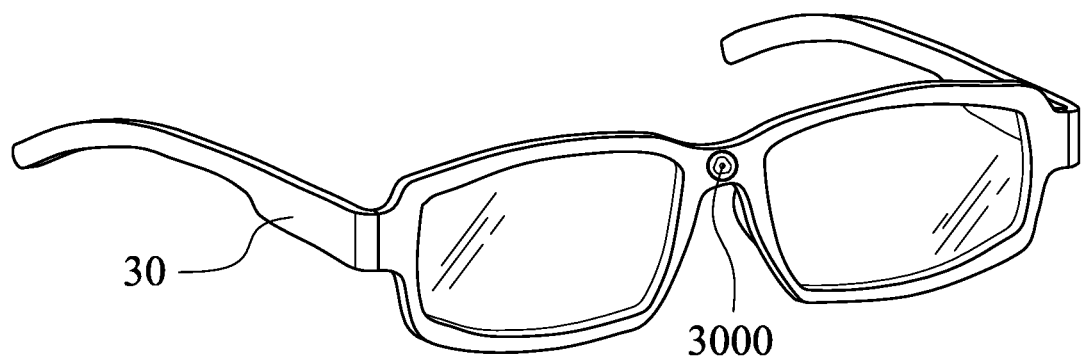
FIG. 10 shows an electronic device according to the 10th embodiment of the present disclosure.

FIG. 10 shows an electronic device 30 according to the 10th embodiment of the present disclosure. The electronic device 30 of the 10th embodiment is a wearable device, wherein the electronic device 30 includes an imaging lens module 3000. The imaging lens module 3000 includes an annular optical element (not shown herein) according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An annular optical element, comprising:
an outer annular surface surrounding a central axis of the annular optical element;
an inner annular surface surrounding the central axis and closer to the central axis than the outer annular surface;
a first side surface connecting the outer annular surface and the inner annular surface;
a second side surface connecting the outer annular surface and the inner annular surface, wherein the second side surface is disposed correspondingly to the first side surface; and
a plurality of strip-shaped wedge structures disposed on the inner annular surface, wherein each of the strip-shaped wedge structures is disposed along a direction from the first side surface towards the second side surface and comprises an acute end and a tapered portion connecting the inner annular surface and the acute end.

2. The annular optical element of claim 1, wherein the annular optical element with the strip-shaped wedge structures is formed integrally.

3. The annular optical element of claim 2, wherein an angle of each of the acute ends is θ, and the following condition is satisfied:

35 degrees<θ<105 degrees.

4. The annular optical element of claim 3, wherein the angle of each of the acute ends is θ, and the following condition is satisfied:

45 degrees<θ<75 degrees.

5. The annular optical element of claim 2, wherein the inner annular surface has a zigzag shape.

6. The annular optical element of claim 5, wherein a cross-section orthogonal to the central axis of each of the strip-shaped wedge structures is isosceles triangle.

7. The annular optical element of claim 2, wherein at least one of the first side surface and the second side surface comprises a recessed portion connected to the outer annular surface.

8. The annular optical element of claim 2, wherein a number of the strip-shaped wedge structures is greater than or equal to 90, and smaller than or equal to 420.

9. The annular optical element of claim 8, wherein the number of the strip-shaped wedge structures is greater than or equal to 150, and smaller than or equal to 360.

10. The annular optical element of claim 2, wherein an entire surface of the acute end and an entire surface of the tapered section of each of the strip-shaped wedge structures are both smooth surfaces.

11. The annular optical element of claim 2, wherein each of the strip-shaped wedge structures has even height.

12. The annular optical element of claim 1, wherein a distance between the inner annular surface and the acute end of each of the strip-shaped wedge structures is h, and the following condition is satisfied:

0.03 mm<h<0.25 mm.

13. The annular optical element of claim 12, wherein the distance between the inner annular surface and the acute end of each of the strip-shaped wedge structures is h, and the following condition is satisfied:

0.04 mm<h<0.15 mm.

14. The annular optical element of claim 2, wherein a minimum inner diameter formed by the strip-shaped wedge structures of the annular optical element is ΦA, a maximum outer diameter of the outer annular surface is ΦB, and the following condition is satisfied:

0.75<ΦA/ΦB<1.0.

15. An imaging lens module, comprising:
the annular optical element of claim 1; and
an optical lens assembly comprising a plurality of lens elements, wherein the annular optical element is connected to at least one of the lens elements.

16. An electronic device, comprising:
the imaging lens module of claim 15.

17. An imaging lens module, which is applied to an electronic device, comprising:
a plastic barrel;
an optical lens assembly disposed in the plastic barrel and comprising a plurality of lens elements; and
an annular optical element disposed in the plastic barrel and comprising:
an outer annular surface surrounding a central axis of the annular optical element;
an inner annular surface surrounding the central axis and closer to the central axis than the outer annular surface;
a first side surface connecting the outer annular surface and the inner annular surface, wherein the first side surface is connected to at least one of the lens elements;
a second side surface connecting the outer annular surface and the inner annular surface, wherein the second side surface is farther from an imaged object than the first side surface and not connected to any of the lens elements; and
a plurality of strip-shaped wedge structures disposed on the inner annular surface, wherein the annular optical element with the strip-shaped wedge structures is formed integrally, and each of the strip-shaped wedge structures is disposed along a direction from the first side surface towards the second side surface and comprises an acute end and a tapered portion connecting the inner annular surface and the acute end.

18. The imaging lens module of claim 17, wherein the plastic barrel comprises an inner surface connected to the annular optical element, the second side surface comprises a recessed portion connected to the outer annular surface, and an air gap is between the recessed portion and the inner surface of the plastic barrel.

19. The imaging lens module of claim 18, further comprising:
a glue material connected to the recessed portion.

20. The imaging lens module of claim 18, wherein a maximum distance orthogonal to the central axis between the recessed portion and the inner surface of the plastic barrel is d, and the following condition is satisfied:

0.01 mm<d<0.20 mm.

21. The imaging lens module of claim 17, wherein an angle of each of the acute ends is θ, and the following condition is satisfied:

35 degrees<θ<105 degrees.

22. The imaging lens module of claim 21, wherein the angle of each of the acute ends is θ, and the following condition is satisfied:

45 degrees<θ<75 degrees.

23. The imaging lens module of claim 17, wherein each of the strip-shaped wedge structures has even height.

24. The imaging lens module of claim 17, wherein a distance between the inner annular surface and the acute end of each of the strip-shaped wedge structures is h, and the following condition is satisfied:

0.03 mm<h<0.25 mm.

25. The imaging lens module of claim 24, wherein the distance between the inner annular surface and the acute end of each of the strip-shaped wedge structures is h, and the following condition is satisfied:

0.04 mm<h<0.15 mm.

26. The imaging lens module of claim 23, wherein an entire surface of the acute end and an entire surface of the tapered section of each of the strip-shaped wedge structures are both smooth surfaces.

27. The imaging lens module of claim 17, wherein a minimum inner diameter formed by the strip-shaped wedge structures of the annular optical element is ΦA, a maximum outer diameter of the outer annular surface is ΦB, and the following condition is satisfied:

0.75<ΦA/ΦB<1.0.

28. The imaging lens module of claim 17, wherein every two strip-shaped wedge structures adjacent to each other are connected to each other.

* * * * *